United States Patent
Inoue et al.

(10) Patent No.: US 11,503,170 B2
(45) Date of Patent: Nov. 15, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Kenta Inoue, Chiba (JP); Daijiro Miyamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/316,558

(22) Filed: May 10, 2021

(65) Prior Publication Data

US 2021/0368050 A1 Nov. 25, 2021

(30) Foreign Application Priority Data

May 22, 2020 (JP) .............................. JP2020-089594

(51) Int. Cl.
*H04N 1/00* (2006.01)
*G06V 30/413* (2022.01)

(52) U.S. Cl.
CPC ....... *H04N 1/00442* (2013.01); *G06V 30/413* (2022.01); *H04N 1/00411* (2013.01); *H04N 2201/0094* (2013.01)

(58) Field of Classification Search
CPC .......... H04N 1/00442; H04N 1/00411; H04N 2201/0094; G06V 30/413; G06V 30/418
USPC ........................................................ 358/1.14
See application file for complete search history.

(56) References Cited

U.S. PATENT DOCUMENTS

2018/0007233 A1* 1/2018 Aramaki ............... G06V 30/413
2019/0065451 A1* 2/2019 Miyamoto ........... G06V 10/235

FOREIGN PATENT DOCUMENTS

JP H08-221558 8/1996
JP H08221558 A * 8/1996

* cited by examiner

*Primary Examiner* — Neil R McLean
(74) *Attorney, Agent, or Firm* — Venable LLP

(57) ABSTRACT

An image processing apparatus including: a determination unit configured to determine a similar form similar to scanned image for each of a plurality of scanned images; and a display control unit configured to perform control such that a list of the plurality of scanned images is displayed on a display unit, wherein scanned images of which the determined similar form are same are displayed together in the list.

19 Claims, 27 Drawing Sheets

CASE OF LEARNED FORM

```
{
  "matched": true,
  "formId": "aaaaaaaa-ffff-49ab-acf8-55558888eeee",
  "matchingScore": 0.745820052699911589,
  "rectInfoArray": [
    {
      "key": "fileRegion0",
      "region": {
        "rect": {
          "x": 1017,
          "y": 302,
          "width": 489,
          "height": 94
        },
        "text": "Quotation "
      }
    },
    {
      "key": "fileRegion1",
      "region": {
        "rect": {
          "x": 386,
          "y": 626,
          "width": 624,
          "height": 70
        },
        "text": "ShimomarukoCorporation    "
      }
    }
  ],
  "metadataArray": [
    {
      "key": "filename",
      "keyType": "filename",
      "value": [
        "fileRegion0",
        "separator",
        "fileRegion1"
      ]
    }
  ]
}
```

FIG.12A

CASE OF UNLEARNED FORM

```
{
  "matched": false,
  "formId": "fffffff-kkkk81ab-acf9-77772222jjjj"
}
```

FIG.12B

BEFORE EXECUTION OF SCAN

| groupNo | formId | fileRegion0 | fileRegion1 | fileRegion2 | ... | fileRegionN |
|---|---|---|---|---|---|---|
| 1 | aaaaaaaa-ffff-49ab-acf8-55558888eeee | Invoice | Shimomaruko Corporation | | | |
| 2 | bbbbbbbb-gggg-23ab-acf4-23121111ffff | Invoice | Kawasaki Corporation | | | |
| 3 | cccccccc-hhhh-89ab-acf5-83719999gggg | | Shinagawa Corporation | | | |
| 4 | dddddddd-iiii-72ab-acf7-91726666hhhh | | Shinagawa Corporation | | | |
| 5 | eeeeeeee-jjjj-60ab-acf5-56717777iiii | Quotation | Tokyo Corporation | | | |
| 6 | | | | | | |
| 7 | | | | | | |

| userText | duplicateNum | formNameArray | formName |
|---|---|---|---|
| | | fileRegion0,separater,fileRegion1 | Invoice_Shimomaruko Corporation |
| | | fileRegion0,separater,fileRegion1 | Invoice_Kawasaki Corporation |
| | 1 | fileRegion0,separater,duplicateNum | ShinagawaCorporation_1 |
| | 2 | fileRegion0,separater,duplicateNum | ShinagawaCorporation_2 |
| Important | | fileRegion0,separater,fileRegion1,separater,userText | Quotation_TokyoCorporation_Important |
| | | | |
| | | | |

FIG.13A

AFTER EXECUTION OF GROUP NAME GENERATION PROCESS FOR SIMILAR FORMS

| groupNo | formId | fileRegion0 | fileRegion1 | fileRegion2 | ... | fileRegionN |
|---|---|---|---|---|---|---|
| 1 | aaaaaaaa-ffff-49ab-acf8-55558888eeee | | Shimomaruko Corporation | | | |
| 2 | bbbbbbb-gggg-23ab-acf4-23121111ffff | Invoice | Kawasaki Corporation | | | |
| 3 | ccccccc-hhhh-89ab-acf5-83719999gggg | | Shinagawa Corporation | | | |
| 4 | dddddd-iiii-72ab-acf7-91726666hhhh | | Shinagawa Corporation | | | |
| 5 | eeeeeee-jjjj-60ab-acf5-56717777iiii | Quotation | Tokyo Corporation | | | |
| 6 | | | | | | |
| 7 | | | | | | |

| userText | duplicateNum | formNameArray | formName |
|---|---|---|---|
| | | fileRegion1 | Shimomaruko Corporation |
| | | fileRegion0,separater,fileRegion1 | Invoice_Kawasaki Corporation |
| | 1 | fileRegion0,separater,duplicateNum | ShinagawaCorporation_1 |
| | 2 | fileRegion0,separater,duplicateNum | ShinagawaCorporation_2 |
| Important | | fileRegion0,separater,fileRegion1,separater,userText | Quotation_TokyoCorporation_Important |
| | | | |
| | | | |

FIG.13B

| No | fileRegion0 | fileRegion1 |
|---|---|---|
| 1 | Invoice | ShimomarukoCorporation |
| 2 | Quotation | ShimomarukoCorporation |
| 3 | | |

FIG.15

AFTER EXECUTION OF GROUP NAME GENERATION PROCESS FOR NEW FORM

| groupNo | formId | fileRegion0 | fileRegion1 | fileRegion2 | ... | fileRegionN |
|---|---|---|---|---|---|---|
| 1 | aaaaaaaa-ffff-49ab-acf8-55558888eeee | | Shimomaruko Corporation | | | |
| 2 | bbbbbbb-gggg-23ab-acf4-23121111ffff | Invoice | Kawasaki Corporation | | | |
| 3 | ccccccc-hhhh-89ab-acf5-83719999gggg | | Shinagawa Corporation | | | |
| 4 | dddddd-iiii-72ab-acf7-91726666hhhh | | Shinagawa Corporation | | | |
| 5 | eeeeeee-jjjj-60ab-acf5-56717777iiii | Quotation | Tokyo Corporation | | | |
| 6 | fffffff-kkkk-81ab-acf9-77772222jjjj | | | | | |
| 7 | | | | | | |

| userText | duplicateNum | formNameArray | formName |
|---|---|---|---|
| | | fileRegion1 | Shimomaruko Corporation |
| | | fileRegion0,separater,fileRegion1 | Invoice_Kawasaki Corporation |
| | 1 | fileRegion0,separater,duplicateNum | ShinagawaCorporation_1 |
| | 2 | fileRegion0,separater,duplicateNum | ShinagawaCorporation_2 |
| Important | | fileRegion0,separater,fileRegion1,separater,userText | Quotation_TokyoCorporation_Important |
| | | | Unlearned01_Quotation_KawasakiCorporation |
| | | | |

FIG.17A

AFTER ENTRY OF FILE INFORMATION ON NEW FORM

| groupNo | formId | fileRegion0 | fileRegion1 | fileRegion2 | ... | fileRegionN |
|---|---|---|---|---|---|---|
| 1 | aaaaaaaa-ffff-49ab-acf8-55558888eeee | | Shimomaruko Corporation | | | |
| 2 | bbbbbbb-gggg-23ab-acf4-23121111fffff | Invoice | Kawasaki Corporation | | | |
| 3 | ccccccc-hhhh-89ab-acf5-83719999gggg | | Shinagawa Corporation | | | |
| 4 | dddddd-iiii-72ab-acf7-91726666hhhh | | Shinagawa Corporation | | | |
| 5 | eeeeeee-jjjj-60ab-acf5-56717777iiii | Quotation | Tokyo Corporation | | | |
| 6 | fffffff-kkkk-81ab-acf9-77772222jjjj | Quotation | Kawasaki Corporation | | | |
| 7 | | | | | | |

| userText | duplicateNum | formNameArray | formName |
|---|---|---|---|
| | | fileRegion1 | Shimomaruko Corporation |
| | | fileRegion0,separater,fileRegion1 | Invoice_Kawasaki Corporation |
| | 1 | fileRegion0,separater,duplicateNum | ShinagawaCorporation_1 |
| | 2 | fileRegion0,separater,duplicateNum | ShinagawaCorporation_2 |
| Important | | fileRegion0,separater,fileRegion1,separater,userText | Quotation_TokyoCorporation_Important |
| | | fileRegion0,separater,fileRegion1 | Quotation_Kawasaki Corporation |
| | | | |

FIG.17B

NEW UNLEARNED FORM

QUOTATION

Quotation No. : M5432
Date of issue : 2018/08/11

Attention:
Kawasaki Corporation
B-B-B, Kawasaki City, Kanagawa,
200-8888

Yokohama Corporation
2-2-200, Yokohama City, Kanagawa,
200-1111

The price has been quoted as below.

| Item | Unit price | Quantity | Amount |
|---|---|---|---|
| GF-1544 | 11,550 | 3 | 34,650 |
| EF24-70 | 134,100 | 1 | 134,100 |
|  |  |  |  |
|  |  |  |  |
|  |  |  |  |
|  |  | Total | 168,750 |

FIG.18A

ANOTHER UNLEARNED FORM SIMILAR TO NEW UNLEARNED FORM

QUOTATION

Attention:
Kawasaki Corporation
B-B-B, Kawasaki City, Kanagawa,
200-8888

Date of issue : 2018/08/11

Yokohama Corporation
2-2-200, Yokohama City, Kanagawa,
200-1111

The price has been quoted as below.

| Item | Unit price | Quantity | Amount |
|---|---|---|---|
| GF-1544 | 11, 550 | 2 | 23, 100 |
| EF24-70 | 134, 100 | 2 | 268, 200 |
|  |  |  |  |
|  |  |  |  |
|  |  |  |  |
|  |  | Total | 291, 300 |

FIG.18B

CHARACTER RECOGNITION RESULT OF NEW UNLEARNED FORM

| rectNo | x | y | width | height | text |
|---|---|---|---|---|---|
| 1 | 131 | 115 | 169 | 68 | Quotation |
| 2 | 147 | 219 | 153 | 35 | 200-888 |
| 3 | 147 | 268 | 307 | 35 | B-B-B, Kawasaki City, Kanagawa |
| 4 | 822 | 130 | 124 | 32 | Quotation No. |
| 5 | 946 | 130 | 90 | 32 | M5432 |
| 6 | 847 | 171 | 98 | 32 | Date of issue |
| 7 | 953 | 171 | 141 | 32 | 2018/08/11 |
| 8 | 817 | 250 | 147 | 32 | 200-111 |
| 9 | 822 | 282 | 292 | 32 | 2-2-200, Yokohama City, Kanagawa |
| 10 | 822 | 323 | 169 | 32 | Yokohama Corporation |
| 11 | 276 | 364 | 252 | 47 | Kawasaki Corporation |
| 12 | 623 | 270 | 58 | 35 | Attention: |
| 13 | 165 | 521 | 363 | 32 | The price has been quoted as below. |
| 14 | 297 | 628 | 56 | 32 | Item |
| 15 | 585 | 628 | 56 | 32 | Unit price |
| 16 | 757 | 630 | 56 | 32 | Quantity |
| 17 | 940 | 631 | 56 | 32 | Amount |
| 18 | 269 | 693 | 112 | 32 | GF-1544 |
| 19 | 569 | 693 | 90 | 32 | 11,550 |
| 20 | 777 | 693 | 16 | 32 | 3 |
| 21 | 922 | 693 | 89 | 32 | 34,650 |
| 22 | 271 | 756 | 106 | 32 | EF24-70 |
| 23 | 562 | 756 | 99 | 32 | 134,100 |
| 24 | 777 | 757 | 16 | 32 | 1 |
| 25 | 914 | 758 | 105 | 32 | 134,100 |
| 26 | 750 | 1040 | 67 | 36 | Total |
| 27 | 904 | 1040 | 126 | 36 | 168,750 |

FIG.19A

CHARACTER RECOGNITION RESULT OF FORM SIMILAR TO NEW UNLEARNED FORM

| rectNo | x | y | width | height | text |
|---|---|---|---|---|---|
| 1 | 132 | 115 | 170 | 68 | Quotation |
| 2 | 148 | 219 | 153 | 35 | 200-888 |
| 3 | 148 | 268 | 307 | 35 | B-B-B, Kawasaki City, Kanagawa |
| 4 | 823 | 130 | 125 | 32 | Quotation No. |
| 5 | 947 | 130 | 90 | 32 | M5432 |
| 6 | 848 | 171 | 98 | 32 | Date of issue |
| 7 | 954 | 171 | 141 | 32 | 2018/08/15 |
| 8 | 818 | 250 | 147 | 32 | 200-111 |
| 9 | 823 | 282 | 292 | 32 | 2-2-200, Yokohama City, Kanagawa |
| 10 | 823 | 323 | 169 | 32 | Yokohama Corporation |
| 11 | 277 | 364 | 252 | 47 | Kawasaki Corporation |
| 12 | 624 | 270 | 58 | 35 | Attention: |
| 13 | 166 | 521 | 363 | 32 | The price has been quoted as below. |
| 14 | 298 | 628 | 56 | 32 | Item |
| 15 | 586 | 628 | 56 | 32 | Unit price |
| 16 | 758 | 630 | 56 | 32 | Quantity |
| 17 | 941 | 631 | 56 | 32 | Amount |
| 18 | 270 | 693 | 112 | 32 | GF-1544 |
| 19 | 570 | 693 | 90 | 32 | 11,550 |
| 20 | 778 | 693 | 16 | 32 | 2 |
| 21 | 923 | 693 | 89 | 32 | 34,100 |
| 22 | 272 | 756 | 106 | 32 | EF24-70 |
| 23 | 563 | 756 | 99 | 32 | 134,100 |
| 24 | 778 | 757 | 16 | 32 | 2 |
| 25 | 915 | 758 | 105 | 32 | 268,200 |
| 26 | 751 | 1040 | 67 | 36 | Total |
| 27 | 905 | 1040 | 126 | 36 | 291,300 |

FIG.19B

```
{
  "matched": false,
  "PormId": "ffffffff-kkkk-81ad-acf9-77772222jjjj",
  "rectInfoArray": [
    {
      "key": "fileRegion0",
      "region": {
        "rect": {
          "x": 131,
          "y": 115,
          "width": 169,
          "height": 68
        },
        "text": "Quotation "
      }
    },
    {
      "key": "fileRegion1",
      "region": {
        "rect": {
          "x": 276,
          "y": 364,
          "width": 252,
          "height": 47
        },
        "text": "KawasakiCorporation   "
      }
    }
    {
      "key": "fileRegion2",
      "region": {
      "rect": {
        "x": 946,
        "y": 130,
        "width": 90,
        "height": 32
      },
      "text": "M5432"
    }
   }
  ],
  "metadataArray": [
    {
      "key": "filename",
      "keyType": "filename",
      "value": [
        "fileRegion0",
        "separator",
        "fileRegion1",
        "separator",
        "fileRegion2"
      ]
    }
  ]
}
```

FIG.21

| No | fileRegion0 | fileRegion1 | fileRegion2 |
|---|---|---|---|
| 1 | Quotation | KawasakiCorporation | M5432 |
| 2 | Quotation | KawasakiCorporation | M5433 |
| 3 | | | |

FIG.22

IMAGE PROCESSING APPARATUS, IMAGE PROCESSING METHOD, AND STORAGE MEDIUM

BACKGROUND OF THE DISCLOSURE

Field of the Disclosure

The present disclosure relates to a process of displaying files of scanned images.

Description of the Related Art

As a document management method, there is a system that manages documents by converting scanned images obtained by reading the documents with a scanner into files of a predetermined format, and setting the file names of these scanned images based on the contents described in the respective documents. In a case where a plurality of documents to be computerized are scanned together, it is conceivable to present the files of the plurality of scanned images in a list form to the user. By presenting the files in a list form to the user, the user can select a desired file from the list and perform operations on the file.

Japanese Patent Laid-Open No. H08-221558 discloses a method involving determining the types of read documents by comparing their image data with predefined template document information, and displaying the documents such that those of the same type are displayed together.

However, the method of Japanese Patent Laid-Open No. H08-221558 cannot display documents of the same type together if their image data do not match the template document information and therefore their document type cannot be determined. This may increase the burden on the user for operations such as finding the file of a desired scanned image from a list of files.

SUMMARY OF THE DISCLOSURE

An object of the present disclosure is to ease the burden on a user for operations for configuring settings of scanned images.

An image processing apparatus of the present disclosure includes: a determination unit configured to determine a similar form similar to scanned image for each of a plurality of scanned images; and a display control unit configured to perform control such that a list of the plurality of scanned images is displayed on a display unit, wherein scanned images of which the determined similar form are same are displayed together in the list.

Further features of the present disclosure will become apparent from the following description of exemplary embodiments with reference to the attached drawings.

BRIEF DESCRIPTION OF THE DRAWINGS

FIGS. 10A and 10B are diagrams illustrating an example of a file name setting screen;

FIGS. 12A and 12B are diagrams illustrating examples of the data structure of analysis result information;

FIGS. 13A and 13B are diagrams illustrating an example of a group name list;

FIG. 15 is a diagram for explaining a process of comparing character strings;

FIGS. 17A and 17B are diagrams illustrating an example of the group name list;

FIGS. 18A and 18B are diagrams illustrating an example of a new form and a similar form similar to the new form;

FIGS. 19A and 19B are diagrams illustrating an example of character recognition results of scanned images;

FIG. 21 is a diagram illustrating an example of data generated by a file information input process; and FIG. 22 is a diagram for explaining a process of comparing character strings.

DESCRIPTION OF THE EMBODIMENTS

Embodiments of the technique of the present disclosure will be described below with reference the drawings. Note that the following embodiments do not limit the invention according to the claims, and not all the combinations of the features described in the embodiments are necessarily essential for the solution provided by the invention.

Embodiment 1

[System Configuration]

Figure 1:
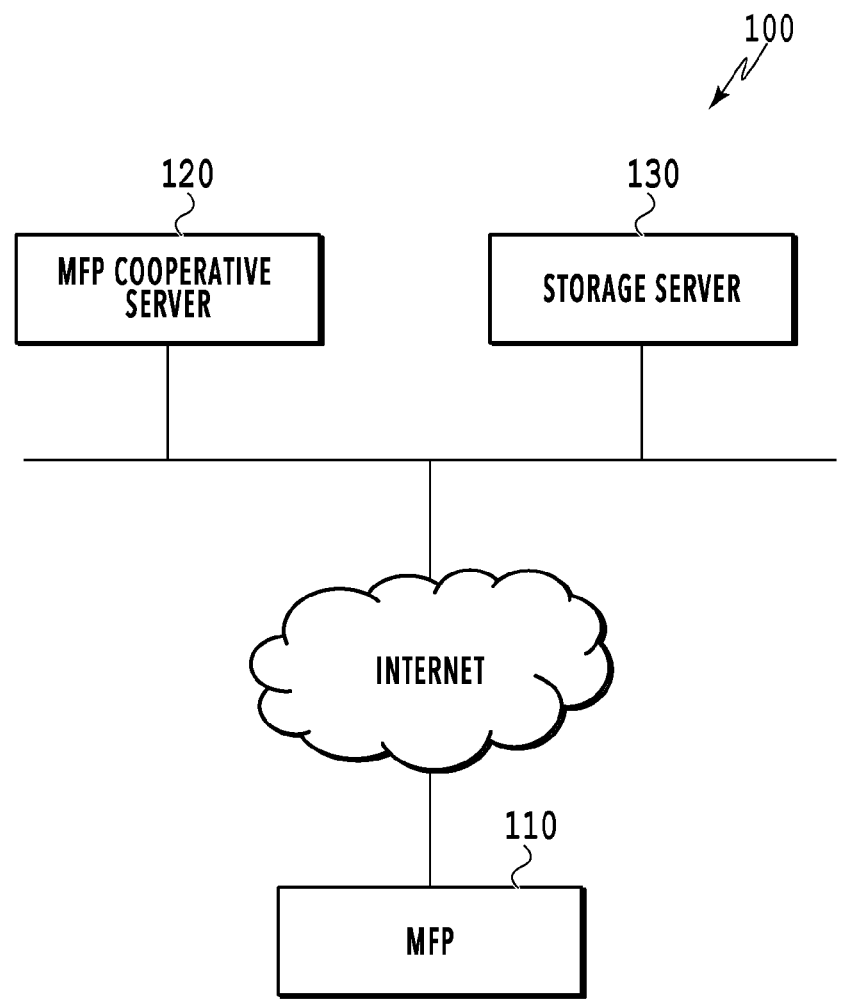
FIG. 1 is a diagram illustrating an entire configuration of an image processing system.

FIG. 1 is a diagram illustrating an entire configuration of an image processing system 100 according to Embodiment 1. The image processing system 100 includes a multifunction peripheral (MFP) 110, an MFP cooperative server 120, and a storage server 130. The MFP 110 is communicatively connected to a server that provides various services over the Internet via a local area network (LAN).

FIG. 1 is a diagram illustrating an entire configuration of an image processing system 100 according to Embodiment 1. The image processing system 100 includes a multifunction peripheral (MFP) 110, and server apparatuses 120 and 130 that provide cloud services over the Internet. The MFP 110 is communicatively connected to the server apparatuses 120 and 130 via the Internet.

The MFP 110 is an example of an image processing apparatus having a scan function. The MFP 110 is a multifunction peripheral having a plurality of functions such as a print function and a BOX save function in addition to the scan function. Both of the server apparatuses 120 and 130 are an example of an image processing apparatus that provides a cloud service. The server apparatus 120 in the present embodiment provides a cloud service that performs an image analysis on scanned images received from the MFP 110 and transfers a request from the MFP 110 to the server apparatus 130 providing another service.

Hereinafter, the cloud service provided by the server apparatus 120 will be referred to as "MFP cooperative service". The server apparatus 130 provides a cloud service that saves files sent thereto via the Internet and provides a saved file in response to a request from a web browser on a mobile terminal (not illustrated) or the like (hereinafter referred to as "storage service"). In the present embodiment, the server apparatus 120, which provides the MFP cooperative service, will be referred to as "MFP cooperative server", and the server apparatus 130, which provides the storage service, will be referred to as "storage server".

The configuration of the image processing system 100 illustrated in FIG. 1 is an example, and the configuration is not limited to this. For example, the MFP 110 may also have the function of the MFP cooperative server 120. Also, the MFP cooperative server 120 may be connected to the MFP 110 not via the Internet but via a local area network (LAN). Also, the storage server 130 may be replaced with a mail server that implements a mail distribution service, and used in a situation of attaching a scanned image of a document to mail and transmitting it.

[Hardware Configuration of MFP]

Figure 2:
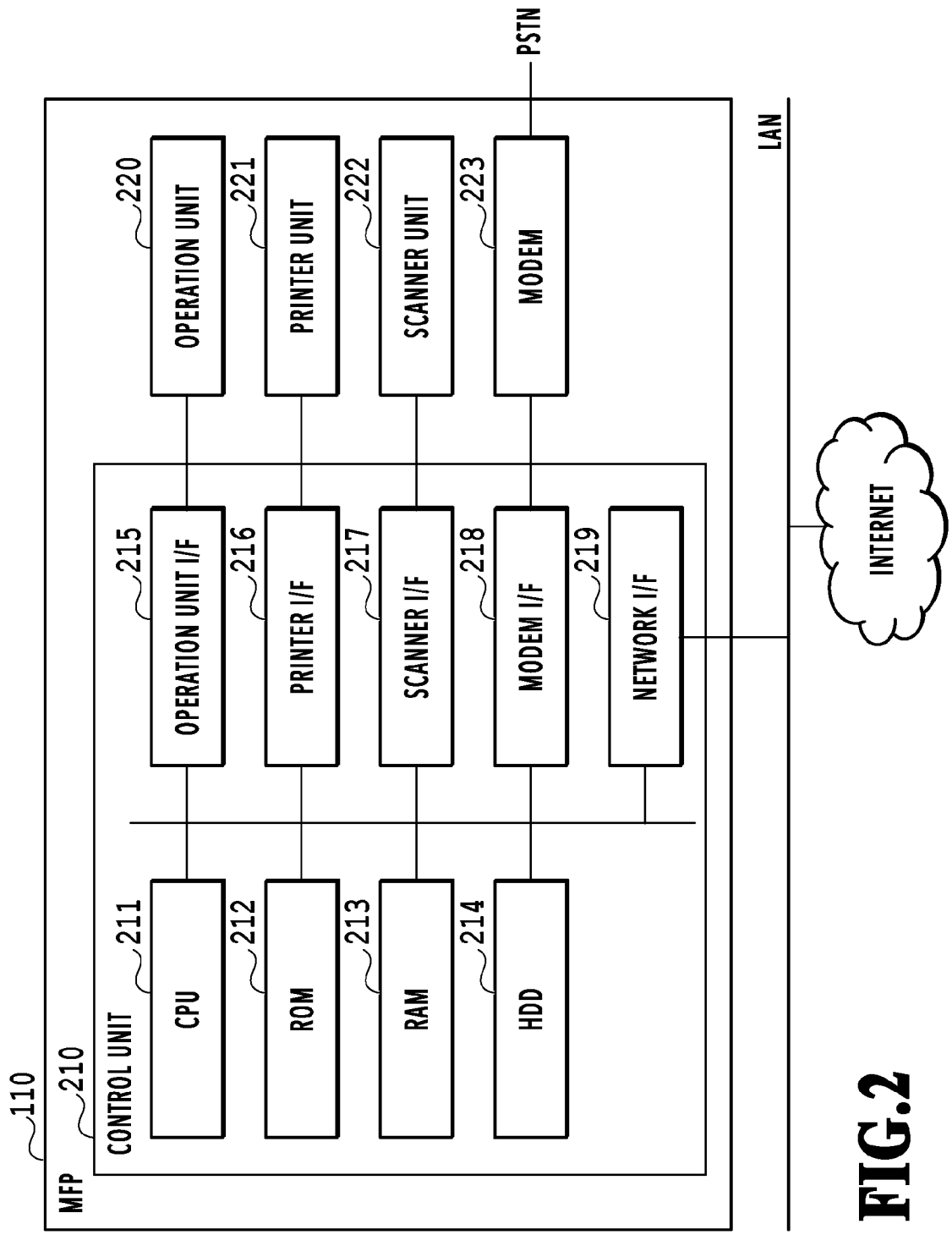
FIG. 2 is a block diagram illustrating a hardware configuration of an MFP.

FIG. 2 is a block diagram illustrating a hardware configuration of the MFP 110. The MFP 110 has a control unit 210, an operation unit 220, a printer unit 221, a scanner unit 222, and a modem 223. The control unit 210 includes components 211 to 219 below and controls the operation of the entire MFP 110. The CPU 211 reads out and executes various control programs stored in the ROM 212 (programs corresponding to the various functions illustrated in the functional configuration diagram to be mentioned later). The RAM 213 is used as temporary storage areas such as a main memory and a work area for the CPU 211. Note that in the present embodiment, a single CPU 211 uses a single memory (RAM 213 or HDD 214) to execute processes illustrated in flowcharts to be mentioned later. However, the configuration is not limited to this. For example, a plurality of CPUs and a plurality of RAMs or HDDs may be caused to cooperate with each other to execute the processes. The HDD 214 is a large-capacity storage unit that stores image data and various programs. The operation unit I/F 215 is an interface that connects the operation unit 220 and the control unit 210.

The operation unit 220 includes a touchscreen that functions also as a display unit, a keyboard, and the like, and accepts user operations, inputs, and instructions. Note that touch operations on the touchscreen include operations with a person's finger and operations with a stylus. The printer I/F 216 is an interface that connects the printer unit 221 and the control unit 210. Image data to be printed is transferred from the control unit 210 to the printer unit 221 via the printer I/F 216, and printed onto a print medium such as paper. The scanner I/F 217 is an interface that connects the scanner unit 222 and the control unit 210. The scanner unit 222 generates scanned image data by optically reading a document set on platen glass or auto document feeder (ADF) not illustrated, and inputs the scanned image data to the control unit 210 via the scanner I/F 217. The scanned image data generated by the scanner unit 222 can be printed (copied and outputted) by the printer unit 221, saved to the HDD 214, or transmitted in the form of a file to an external apparatus such as the MFP cooperative server 120 via a LAN. The modem I/F 218 is an interface that connects the modem 223 and the control unit 210. The modem 223 performs facsimile communication of image data with a facsimile (not illustrated) on a PSTN. The network I/F 219 is an interface that connects the control unit 210 (MFP 110) to a LAN. The MFP 110 transmits scanned image data to the MFP cooperative server 120 or receives various pieces of data from the MFP cooperative server 120 by using the network I/F 219. The hardware configuration of the MFP 110 described above is an example and may include another configuration(s) or omit part of the configuration as necessary.

[Hardware Configurations of Servers]

Figure 3:
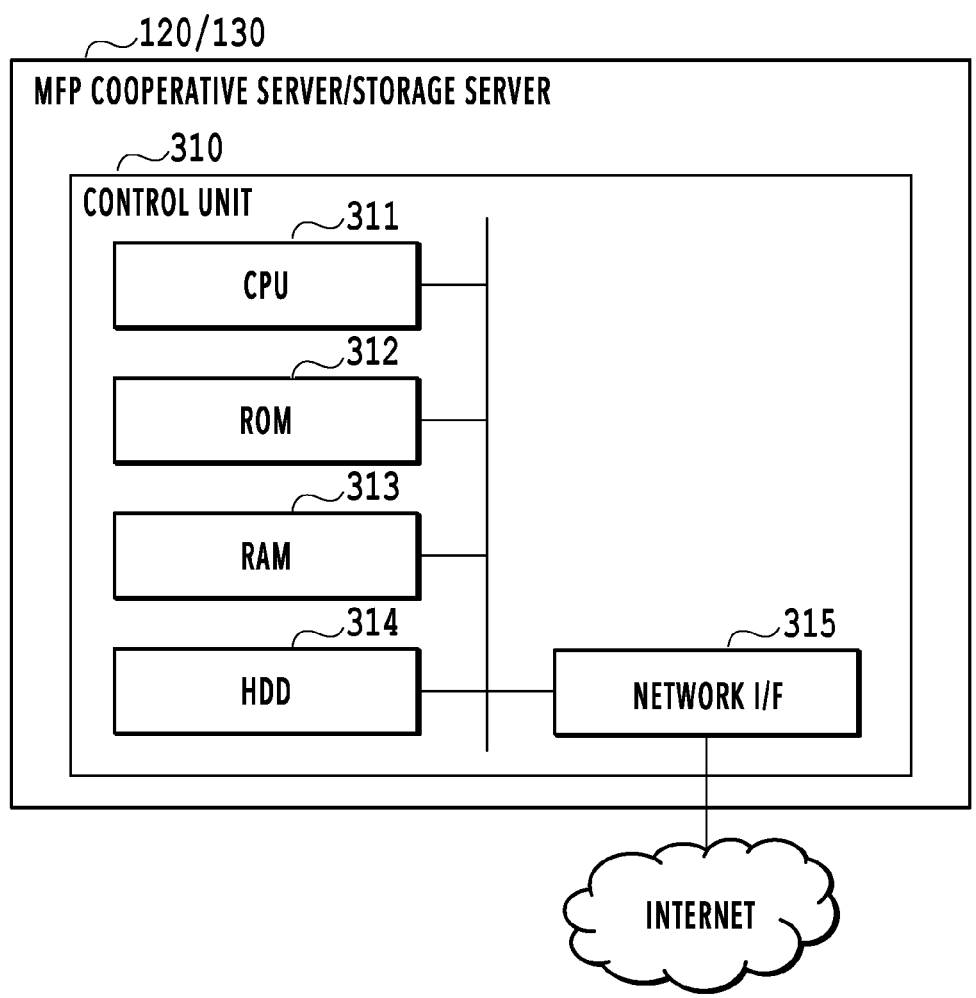
FIG. 3 is a block diagram illustrating hardware configurations of an MFP cooperative server and a storage server.

FIG. 3 is a block diagram illustrating hardware configurations of the MFP cooperative server 120 and the storage server 130. The MFP cooperative server 120 and the storage server 130 have a common hardware configuration, and include a CPU 311, a ROM 312, a RAM 313, an HDD 314, and a network I/F 315. The CPU 311 reads out a control program stored in the ROM 312 and executes various processes to control the entire operation. The RAM 313 is used as temporary storage areas such as a main memory and a work area for the CPU 311. The HDD 314 is a large-capacity storage unit that stores image data and various programs. The network I/F 315 is an interface that connects the control unit 310 to the Internet. The MFP cooperative server 120 and the storage server 130 receive requests for various processes from other apparatuses (such as the MFP 110) and return process results corresponding to these requests via the network I/F 315.

[Functional Configuration of Image Processing System]

Figure 4:
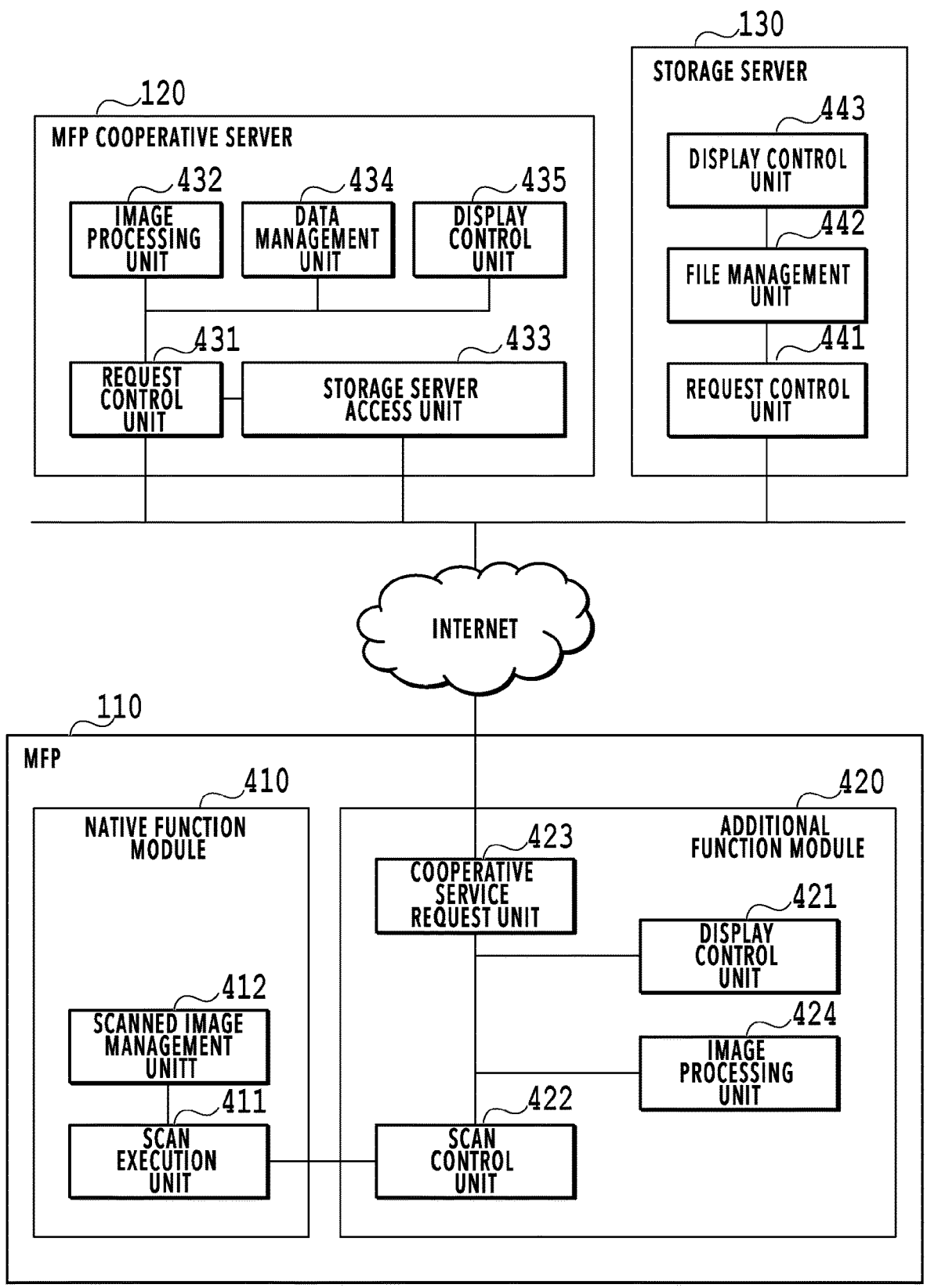
FIG. 4 is a block diagram illustrating a functional configuration of the image processing system.

FIG. 4 is a block diagram illustrating a functional configuration of the image processing system 100 according to the present embodiment. Functional configurations corresponding to the roles of the MFP 110 and the MFP cooperative server 120 and storage server 130 forming the image processing system 100 will be described below in turn. Note that the description will focus on, of the various functions of each apparatus, functions related to processes from scanning a document to computerize it (convert it into a file) to saving the computerized document to the storage server 130.

[Functional Configuration of MFP]

The function modules of the MFP 110 are generally classified into two function modules, namely, a native function module 410 and an additional function module 420. The native function module 410 is an application normally included in the MFP 110 whereas the additional function module 420 is an application additionally installed in the MFP 110. The additional function module 420 is an application based on Java (registered trademark), which enables its functions to be easily added to the MFP 110. Note that other additional applications not illustrated may be installed in the MFP 110.

The native function module 410 has a scan execution unit 411 and a scanned image management unit 412. The additional function module 420 has a display control unit 421, a scan control unit 422, a cooperative service request unit 423, and an image processing unit 424.

The display control unit 421 displays user interface screens (UI screens) for accepting various user operations on the touchscreen of the operation unit 220. Examples of the various user operations include entering login authentication information for accessing the MFP cooperative server 120, configuring the scan settings, issuing an instruction to start a scan, setting a file name, issuing an instruction to save a file, and so on.

In response to an user operation performed on a UI screen (e.g., pressing a "Start scan" button), the scan control unit 422 issues an instruction to execute a scan process to the scan execution unit 411 along with scan setting information. According to the instruction to execute a scan process from the scan control unit 422, the scan execution unit 411 causes the scanner unit 222 to execute a document read process via the scanner I/F 217 to thereby generate scanned image data. The scanned image management unit 412 saves the generated scanned image data to the HDD 214. At this time, the scan control unit 422 is notified of information of a scanned image identifier uniquely indicating the saved scanned image data. The scanned image identifier is a number, a symbol, alphabetical characters, or the like uniquely identifying the image scanned by the MFP 110. The scan control unit 422, for example, obtains scanned image data to be converted into a file from the scanned image management unit 412 by using its scanned image identifier mentioned above. Then, the scan control unit 422 instructs the cooperative service request unit 423 to issue a request to the MFP cooperative server 120 for processes necessary for the conversion into a file.

The cooperative service request unit 423 issues requests to the MFP cooperative server 120 for various processes, and receives responses to these requests. Examples of the various processes include login authentication, analysis of the scanned image, transmission of the scanned image data, and so on. A communication protocol such as REST or SOAP is used in the communication with the MFP cooperative server 120. The image processing unit 424 performs predetermined processes on the scanned image data to generate an image to be used in an UI screen to be displayed by the display control unit 421.

Note that an apparatus other than the MFP 110 (such as a client PC not illustrated) may have some of the functions implemented by the above-described additional function module 420 and the like. Specifically, the system configuration may be such that the client PC requests an analysis of a scanned image obtained by the MFP 110, sets a file name based on the analysis result, and performs other similar operations.

Also, in the case where the client PC sets a file name and performs other similar operations, the configuration may be such that a program (module) for setting a file name or the like is installed in the client PC in advance. However, the configuration is not limited to this. For example, the configuration may be such that a general-purpose web browser provided to the client PC is utilized to obtain a web application for setting a file name or the like from the MFP cooperative server 120 and execute it.

[Functional Configurations of Server Apparatuses]

First, the functional configuration of the MFP cooperative server 120 will be described. The MFP cooperative server 120 has a request control unit 431, an image processing unit 432, a storage server access unit 433, a data management unit 434, and a display control unit 435. The request control unit 431 stands by in a state where it can receive requests from external apparatuses, and instructs the image processing unit 432, the storage server access unit 433, and the data management unit 434 to execute predetermined processes according to the contents of a request received.

The image processing unit 432 performs, on scanned image data sent from the MFP 110, an analysis process such as a process of detecting character regions, a character recognition process (OCR process), and a process of determining whether a similar document is present, and also an image modification process such as turning the scanned image data and correcting its tilt. Note that each character region detected from a scanned image will be hereinafter referred to as "text block". Also, the following description will be given using a form such as a quotation or an invoice as an example of the target document, and its scanned image may be referred to as "form image".

The storage server access unit 433 issues a request to the storage server 130 for processes. Cloud services have made various interfaces publicly available which are for saving files to a storage server and obtaining saved files by using a protocol such as REST or SOAP. The storage server access unit 433 issues requests to the storage server 130 by using a publicly available interface. The data management unit 434 holds and manages user information, image analysis results, various pieces of setting data, and so on to be managed in the MFP cooperative server 120.

The display control unit 435 returns screen layout information (such as HTML and CSS) necessary to display a screen in response to receiving a request from a web browser running on a PC or mobile terminal (neither of which is illustrated) connected via the Internet. Via the screen displayed on the web browser, the user can check registered user information and change the scan settings.

Next, the functional configuration of the storage server 130 will be described. The storage server 130 has a request control unit 441, a file management unit 442, and a display control unit 443. The request control unit 441 stands by in a state where it can receive requests from external apparatuses and, in the present embodiment, instructs the file management unit 442 to save a received file or read out a saved file in response to a request from the MFP cooperative server 120. The request control unit 441 then returns a response corresponding to the request to the MFP cooperative server 120. The display control unit 443 returns screen layout information (such as HTML and CSS) necessary to display a screen in response to receiving a request from a web browser running on a PC or mobile terminal (neither of which is illustrated) connected via the Internet. Via the screen displayed on the web browser, the user can check and obtain saved files.

[Entire Flow of Processing]

Figure 5:
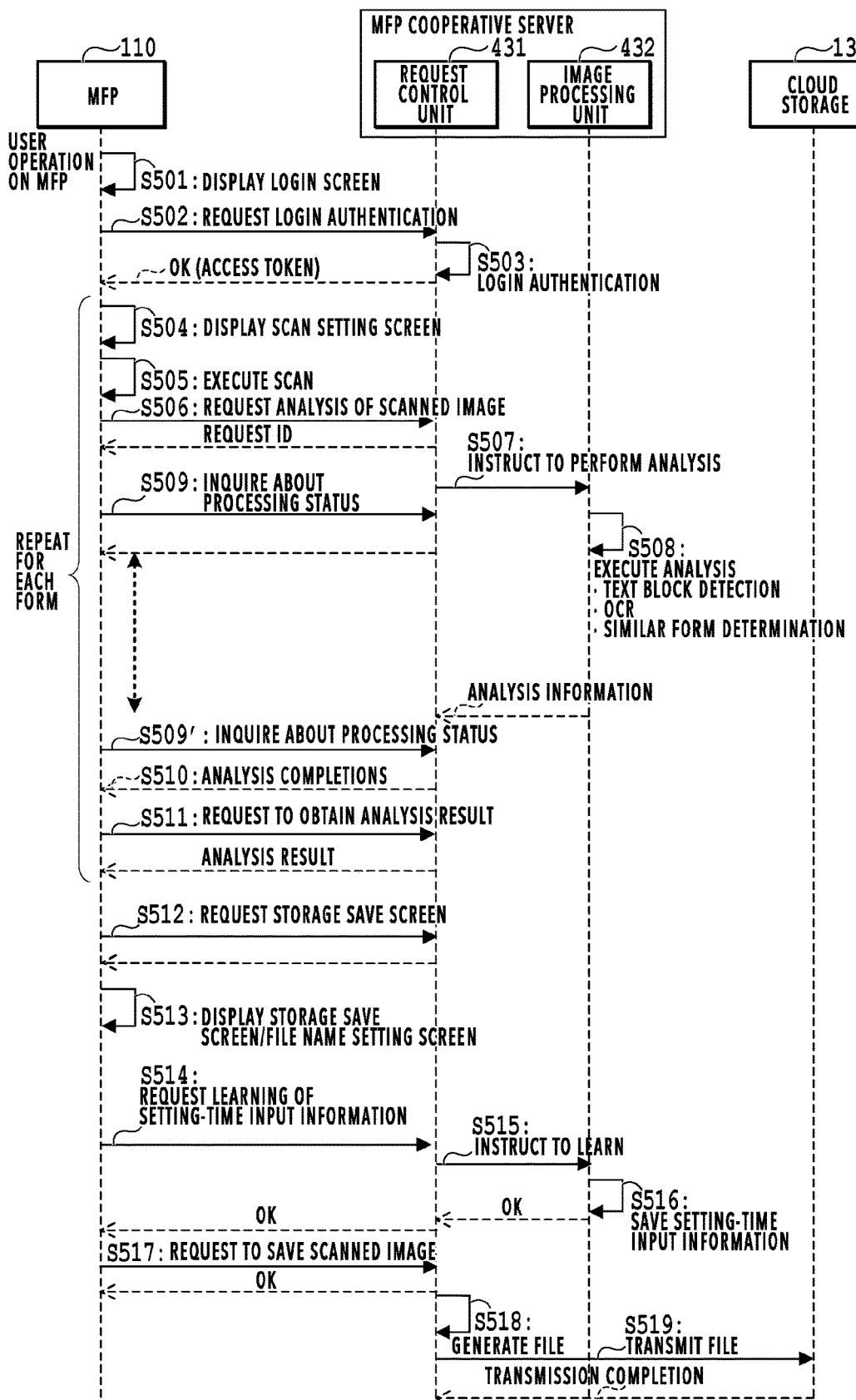
FIG. 5 is a sequence chart illustrating a flow of processing in the entire image processing system.
Figure 6:
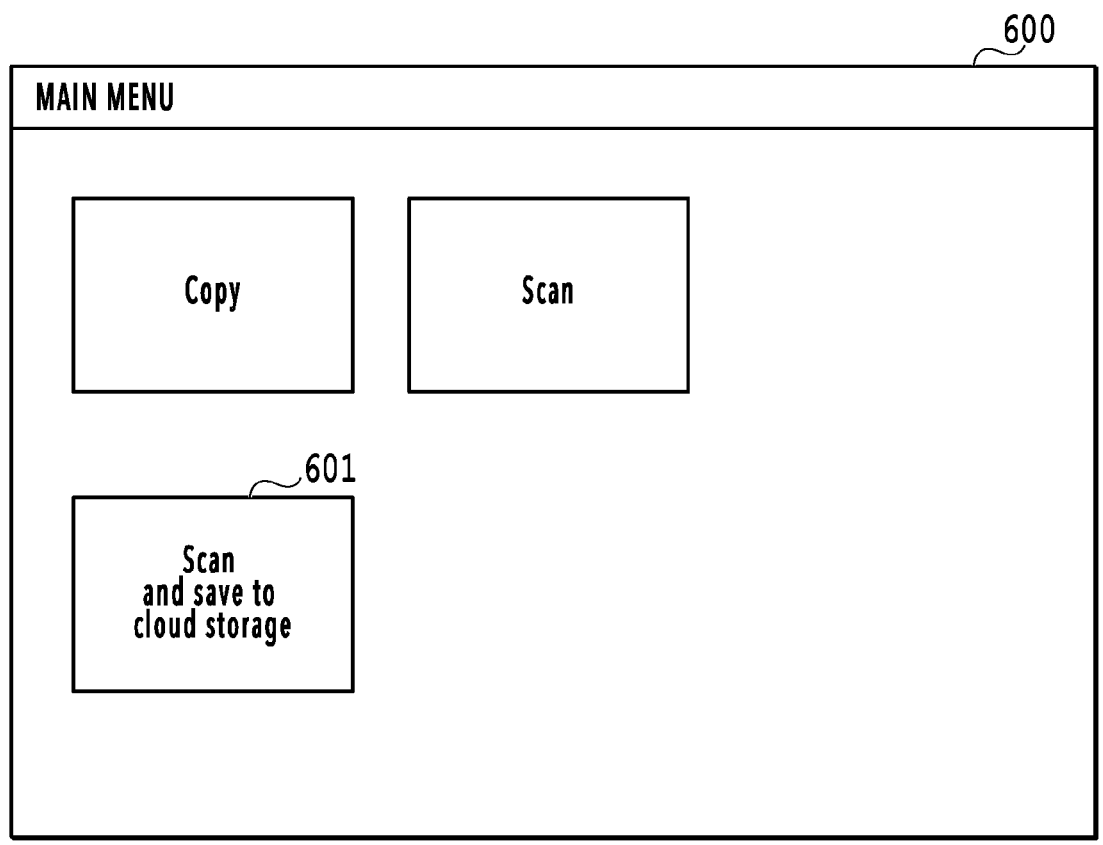
FIG. 6 is a diagram illustrating an example of a UI screen of a main menu.

FIG. 5 is a sequence chart illustrating a flow of processing performed between the apparatuses in a case of scanning documents (forms) with the MFP 110, converting the obtained form images into files, and saving them to the storage server. FIG. 6 is a diagram illustrating an example of a UI screen of a main menu displayed upon activation of the MFP 110 (hereinafter referred to as "main screen"). By installing a dedicated application necessary for scanning a document, converting it into a file, and utilizing the cloud storage service into the MFP 110, a "Scan and save to cloud storage" button 601 is displayed in a main screen 600. Then, when the user presses the "Scan and save to cloud storage" button 601 among the menu buttons displayed in the main screen 600, the series of processes illustrated in the sequence chart in FIG. 5 is started. Note that the sequence chart in FIG. 5 describes a case of setting file names to be given to scanned images at the time of converting them into files. However, the sequence chart is applicable to general properties such as folder paths and metadata, besides file names.

The communication between the apparatuses will be described below in chronological order along the sequence chart in FIG. 5. Note that the symbols "S" in the following description represent steps.

Figure 7:
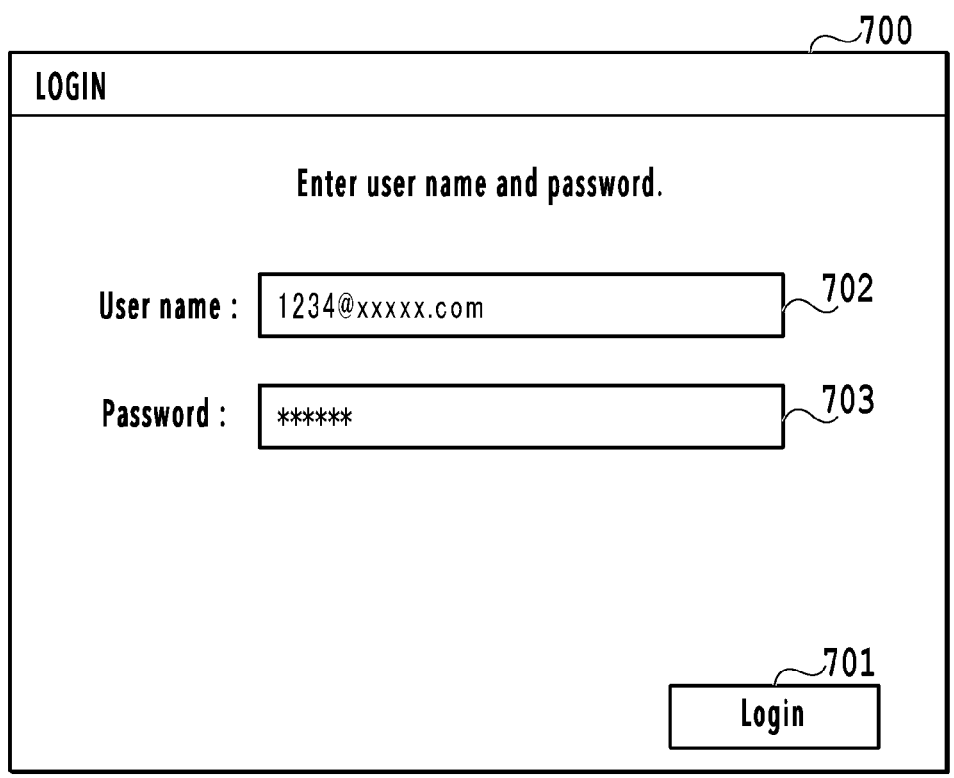
FIG. 7 is a diagram illustrating an example of a login screen.

The MFP 110 displays a UI screen for entering login authentication information for accessing the MFP cooperative server 120 (hereinafter referred to as "login screen") on the operation unit 220 (S501). FIG. 7 illustrates an example of the login screen. When the user enters a preregistered user ID and password respectively into entry fields 702 and 703 in a login screen 700 and presses a "Login" button 701, a login authentication request is transmitted to the MFP cooperative server 120 (S502).

In response to receiving the login authentication request, the MFP cooperative server 120 performs an authentication process by using the user ID and password contained in the request (S503). In a case where the user is confirmed as a genuine user by the authentication process, the MFP cooperative server 120 returns an access token to the MFP 110. When various requests are subsequently issued from the MFP 110 to the MFP cooperative server 120, this access token is sent along with them so that the logged-in user can be identified. In the present embodiment, by completing login to the MFP cooperative server 120, login to the storage server 130 is also completed at the same time. Thus, the user links a user ID for utilizing the MFP cooperative service and a user ID for utilizing the storage service with each other via a web browser on a PC (not illustrated) or the like on the Internet in advance. In this way, if the authentication of login to the MFP cooperative server 120 succeeds, the authentication of login to the storage server 130 is also completed at the same time. This can omit an operation for logging in to the storage server 130. The MFP cooperative server 120 can handle requests related to the storage service from the user having logged in to the MFP cooperative server 120. Note that, as for the login authentication method, a generally and publicly known method (such as Basic authentication, Digest authentication, or authentication using OAuth) may be used to perform the login authentication.

Figure 8:
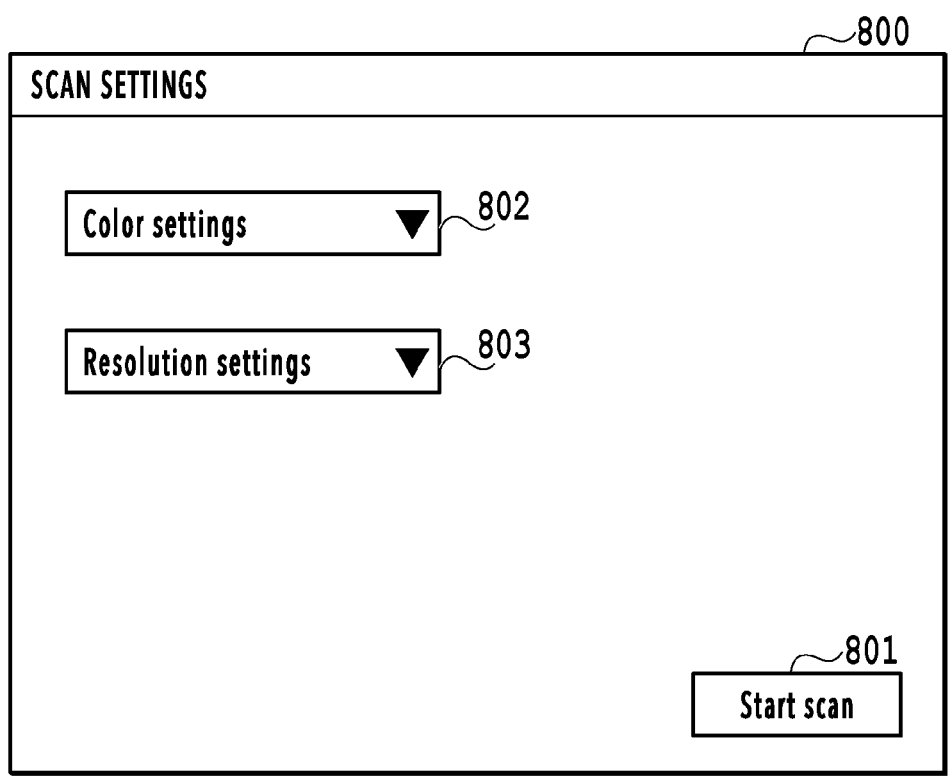
FIG. 8 is a diagram illustrating an example of a scan setting screen.

After the login is completed, a UI screen for configuring the scan settings (hereinafter referred to as "scan setting screen") is displayed on the operation unit 220 of the MFP 110 (S504). FIG. 8 illustrates an example of the scan setting screen. A scan setting screen 800 includes a "Start scan" button 801, a color setting field 802, and a resolution setting field 803. The "Start scan" button 801 is a button for issuing an instruction to start a scan process on a document (assumed to be a form such as a quotation or an invoice in the present embodiment) set on the platen glass. In the color setting field 802, the color mode for scanning is set. The color mode can be designated from among choices such as full color and black-and-white, for example. In the resolution setting field 803, the resolution for scanning is set. The resolution can be designated from among choices such as 600 dpi and 1200 dpi, for example. Note that the color mode and the resolution are an example of setting items. Not all of them have to be present, and/or a setting item other than them may be present. Also, the choices for the color mode and the resolution may be limited only to setting values required by the storage service. The logged-in user sets specific conditions for the scan process via the scan setting screen 800 as above. When the logged-in user having finished configuring the scan settings sets a scan-target document on the platen glass of the MFP 110 and presses the "Start scan" button 801, a scan is executed (S505). Consequently, scanned image data as a computerized paper document is generated. After the completion of the scan, the MFP 110 transmits the scanned image data obtained by the scan to the MFP cooperative server 120 along with an analysis request for the scanned image data (S506).

In the MFP cooperative server 120 having received the analysis request for the form image, the request control unit 431 instructs the image processing unit 432 to execute an analysis process (S507). In doing so, the request control unit 431 returns a request ID which can uniquely identify the received analysis request to the MFP 110.

On the other hand, the image processing unit 432, in response to receiving the instruction to execute the analysis process, executes the analysis process on the form image associated with the analysis request (S508). In this analysis process, the image processing unit 432 firstly performs a process of detecting the text blocks present in the analysis-target form image. For the text block detection, a known method may be employed such as a method in which rectangular regions assumed to be characters are extracted from an image binarized based on a threshold value, for example. Thereafter, the image processing unit 432 performs a character recognition process (OCR: Optical Character Recognition) on each text block found by the text block detection process.

The image processing unit 432 then performs a process of determining whether the analysis-target form image is similar to a previously computerized form image by matching the analysis-target form image with forms registered as learned data (form determination process). A previous form (image) similar to the analysis-target form image will be referred to as the similar form.

This form determination process uses arrangement information indicating where each text block present in the analysis-target form image is located in this form image. Specifically, the arrangement information on the current analysis-target form image and the arrangement information on a previous form image registered in the learned data or the like are compared with each other to determine whether or not their text block arrangements are the same or similar. This is based on the idea that forms can be assumed as forms of the same type created by using the same document format (form format) if their text block arrangements are the same or similar.

The result obtained by this analysis process is passed to the request control unit 431. Note that in the present embodiment, whether the forms are similar or not is determined based solely on the degree of match between their text block arrangements. However, for example, the types of the forms (quotation, invoice, etc.) may be identified from their OCR results and whether they are similar or not may be determined with the obtained type information taken into account. Note that details of this step will be described later with reference to FIG. 11.

While the above analysis process is performed, the MFP 110 inquires of the MFP cooperative server 120 about the processing status regularly (e.g., at intervals of about several hundred milliseconds to several milliseconds) by using the above-mentioned request ID (S509 to S509'). This inquiry is repeatedly made until a response indicating completion of the analysis process is obtained from the MFP cooperative server 120 (S510). In response to receiving the inquiry about the processing status, the MFP cooperative server 120 checks the progress of the analysis process associated with the request ID and, in a case where the process has not been completed, returns a response indicating that the process is still being performed.

The response contains "status" as an item indicating the current processing status, and a character string held in "status" indicates the current processing status. For example, in a case where the character string held in "status" is "processing", it indicates that the process is being performed by the MFP cooperative server 120. In a case of "completed", it indicates that the process has been completed. In a case of "failed", it indicates that the process has failed. In a case of "completed", it indicates that the process has been completed. Note that, the response contains analysis result information obtained by analyzing the scanned image, scan setting information, and so on in addition to "status".

After receiving a process completion response, the MFP 110 issues a request to the MFP cooperative server 120 for the result of the analysis process by using a URL indicating a storage destination for the image analysis result contained in the response (S511). In response to receiving the request, the request control unit 431 of the MFP cooperative server 120 returns information on the result of the analysis process.

Thereafter, the series of processes from displaying the scan setting screen to obtaining an image analysis result (S504 to S511) is repeated as many times as the number of forms to be converted into a file. Alternatively, the plurality of forms may be scanned together in S505 and, based on an analysis request for each form image (S506), an analysis instruction (S507) may be issued and an analysis process (S508) may be performed on a form-by-form basis.

The MFP 110 requests an UI screen (storage save screen) on which to check a list of the scanned forms, set the file name of a form image, and designate a file to be saved to the storage server 130 (S512). The MFP 110 displays the storage save screen on the touchscreen of the operation unit 220 based on screen information generated according to control by the display control unit 435 of the MFP cooperative server 120 (S513). Details of the storage save screen will be described later.

The UI screen is displayed, for example, by a web browser installed in the MFP 110. Using a URL for displaying the storage save screen, the MFP 110 accesses this URL to obtain screen information for displaying the storage save screen from the MFP cooperative server 120. The user can check a list of the files of the form images on the storage save screen with the web browser of the MFP 110.

When the user selects the file of a form image on a scanned form list 901 (see FIG. 9) in a storage save screen 900 and presses an "Edit" button 903 (see FIG. 9), the MFP 110 accepts these inputs. The MFP 110 then displays a file name setting screen 1000 (see FIGS. 10A and 10B) for setting the file name of the selected form image. The file name setting screen 1000 will be described later. Thereafter, when the user enters a file name on the file name setting screen 1000 and presses an "OK" button 1007 (see FIGS. 10A and 10B), the MFP 110 accepts these inputs and returns the screen to the storage save screen 900.

When the user presses a "Send" button 902 (see FIG. 9) in the storage save screen 900, the MFP 110 accepts this input. The MFP 110 transmits a learning request to the MFP cooperative server 120 (S514), the learning request containing information on the input operation performed by the user at the time of setting a property such as the file name of the scanned image of the form selected by the user (setting-time input information).

In the MFP cooperative server 120 having received the learning request, the request control unit 431 instructs the image processing unit 432 to execute a learning process (S515). The image processing unit 432 saves the arrangement information on each text block present in the analysis-target form image and the information inputted at the time of setting its file name, which is contained in the learning request received in S514 (information on the one or more text blocks used for the file name), as learned data (S516). After the learning process is completed, the request control unit 431 returns a response indicating completion of the process to the MFP 110.

The MFP 110 thereafter transmits a request to save the selected form image to the MFP cooperative server 120 along with the data of this form image and information on its file name and the like to be set at the time of transmitting the file of the form image (S517). In the MFP cooperative server 120 having received the save request, the request control unit 431 starts a file generation process and returns a response indicating that the save request has been normally received to the MFP 110.

In response to receiving this response, the MFP 110 deletes the file of the transmitted form image from the list. The MFP 110 then ends its processing and returns to the state of displaying the scan setting screen (S504).

The MFP cooperative server 120, on the other hand, obtains information on a file format from preregistered scan settings, and converts the form image into a file by following this file format (S518). The form image file thus generated is transmitted and saved to the storage server 130 (S519).

[Storage Save Screen]

Figure 9:
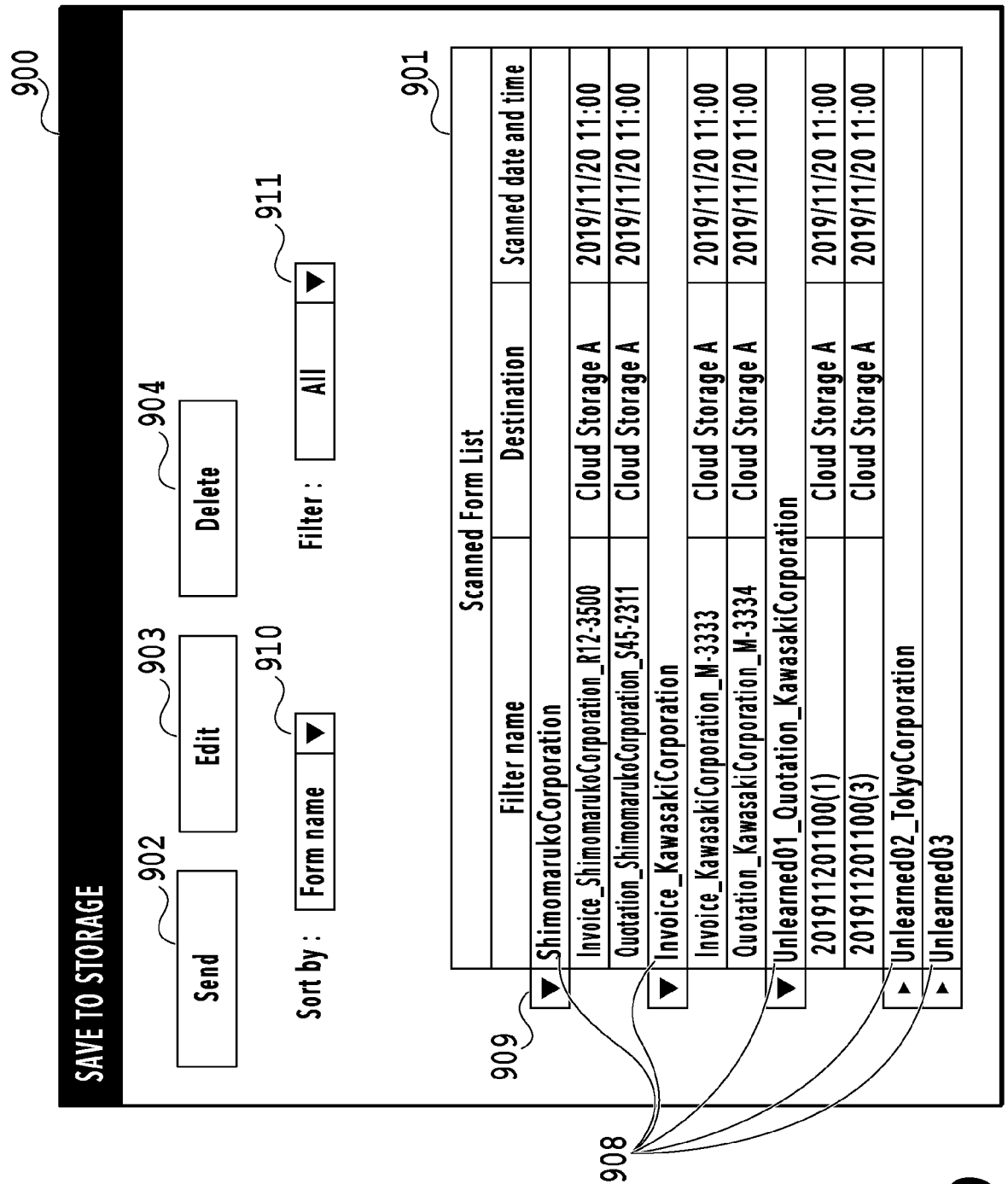
FIG. 9 is a diagram illustrating an example of a storage save screen.

FIG. 9 is a diagram illustrating an example of the storage save screen 900 displayed on the touchscreen of the MFP 110 in S513. On the storage save screen 900, the user can check a list of files of form images before being transmitted to the storage server 130 after being subjected to the image analysis process.

In the storage save screen 900 in FIG. 9, there are the scanned form list 901, the "Send" button 902, the "Edit" button 903, and a "Delete" button 904. Further, there are group bars 908, group display switch buttons 909, a list display order key selection list 910, and a list display filter list 911.

The "Delete" button 904 is a button for deleting the file of a form image. When the user selects the file of any form image from the scanned form list 901 and presses the "Delete" button 904, the file of the selected form image is deleted from the scanned form list 901.

The "Edit" button 903 is a button for switching to a UI screen for setting the file name of the file of a form image. When the user selects the file of any form image from the storage save screen 900 and presses the "Edit" button 903, the MFP 110 accepts this instruction. Then, the display control unit 421 of the MFP 110 issues a request to the MFP cooperative server 120 for the UI screen for setting the file name of the selected form image (hereinafter referred to as "file name setting screen") and displays the file name setting screen on the touchscreen.

Figure 10A:
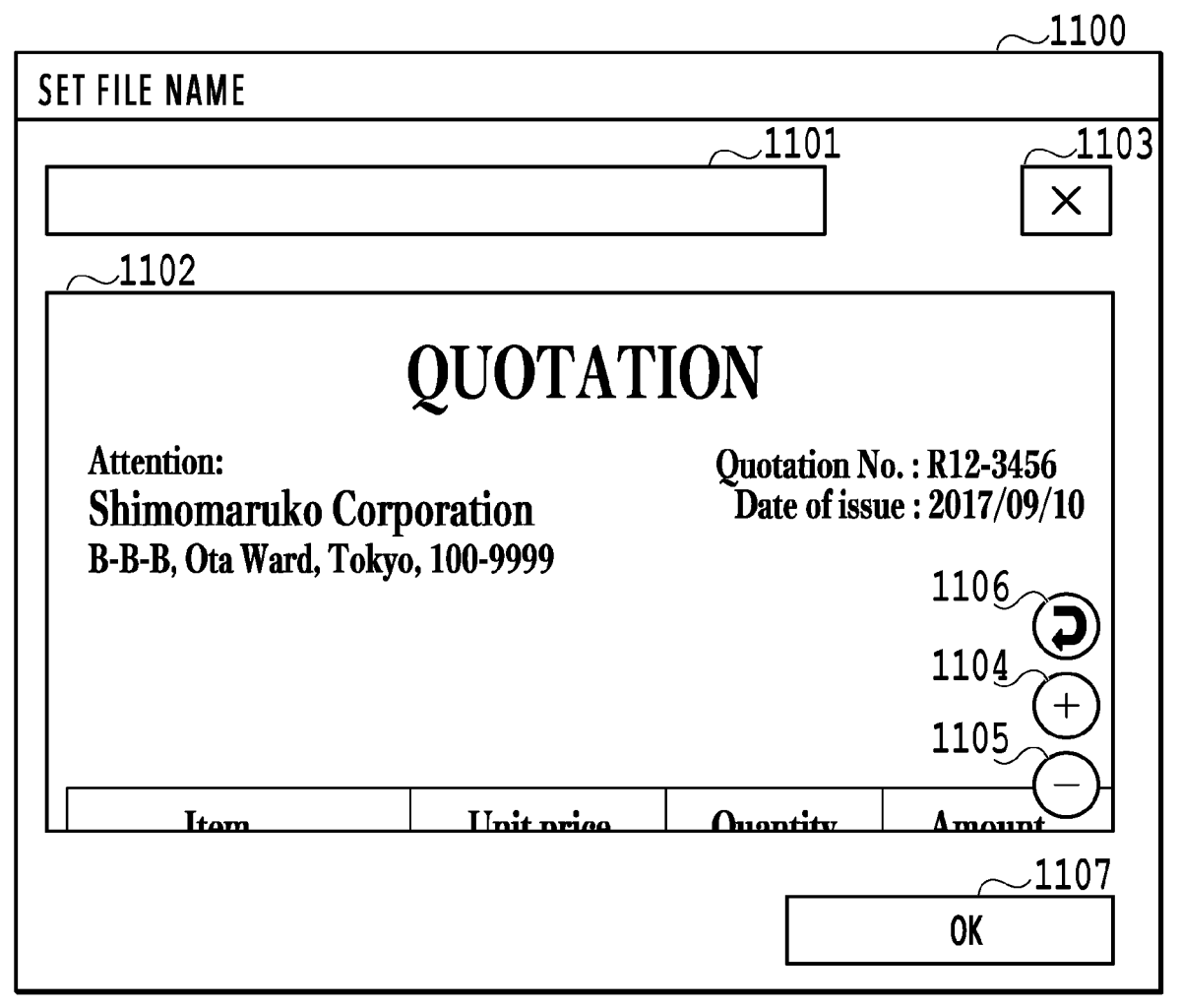
Figure 10B:
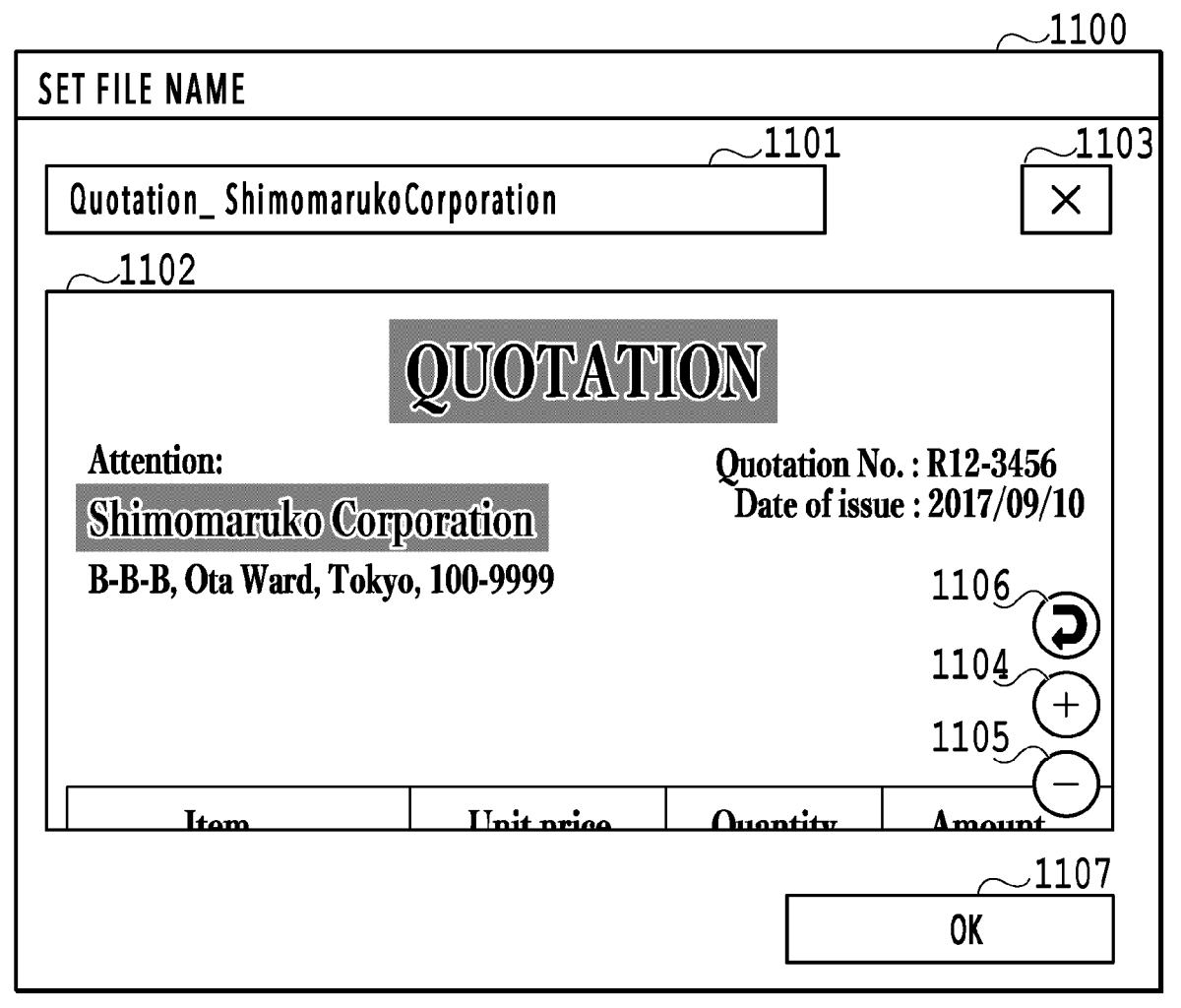

FIGS. 10A and 10B are diagrams illustrating an example of the file name setting screen 1000. When the user sets the file name on the file name setting screen 1000 and presses the "OK" button 1007, the screen displayed on the touchscreen returns to the storage save screen 900 illustrated in FIG. 9 again. The file name setting screen 1000 will be described later.

The "Send" button 902 is a button for transmitting the file data of a form image to the storage server 130. When the user selects the file of any form image from the scanned form list 901 and presses the "Send" button 902, the file of the selected form image is transmitted to the storage server 130. Note that in a case where the transmission of the file is normally completed, the information of the single row corresponding to the file is deleted from the scanned form list 901.

In the scanned form list 901, information on the files of the form images obtained by the scans performed this time is displayed in a list form such that each row displays a single file. The scanned form list 901 has three items "File name", "Destination", "Scan date and time".

The "File name" is a column that displays the file names of the form images obtained by the scans performed this time. In a case where a form image is of a learned form, the file name of this form image is generated based on learned input information in a form similar to this form image and the character recognition result of the form image. In a case where a form image is of an unlearned form, a default file name is generated, such as the date and time at which it scan was executed. Then, the generated file name is displayed in the column "File name".

Note that "learned" refers to a form for which it is determined in the form determination process that a form created with the same form format (similar form) is present in the learned data and information used to set a property of this similar form such as its file name (setting-time input information) has been saved. Also, "unlearned" refers to a form for which setting-time input information has not been saved. That is, if it is determined that no similar form is present in the form determination process, the analysis-target form image is of a new form and is therefore of an unlearned form.

Note that the default file name to be generated for an unlearned form may be settable by the user before it is scanned. In the case where the user enters a file name on the above-described file name setting screen 1000, that name is displayed.

The "Destination" is an item that displays the name of the storage server 130, to which the files are to be transmitted. The "Scan date and time" is an item that displays the date and time at which the forms were scanned.

In the present embodiment, the files of the form images displayed in the scanned form list 901, which have been obtained by the scans performed this time, can be displayed such that similar forms are arranged together. That is, form images determined as being similar to the same form in the similar form determination in S508 can be assumed as forms of the same type, and the files of this set of form images can be displayed together as one group.

Further, in the present embodiment, unlearned form images can also be displayed such that similar form images are displayed together. In this way, even in a case where a plurality of new forms are scanned, the user can easily find a desired file from the scanned form list 901, which can ease the burden on the user. A method of determining a form similar to an unlearned form image will be described later with reference to FIG. 11.

Each of the group bars 908 is a region for displaying a name identifying a group of files of form images displayed together as the same group (group name). The group bars 908 are added for respective groups.

For example, for learned form images, the group name of a similar form similar to them is obtained and displayed as their group name. For unlearned form images, a group name containing a character string indicating "unlearned", for example, is displayed. Meanwhile, the background color of the group bars 908 for groups of unlearned form images may be changed to a different color from that of the group bars for groups of learned form images. Alternatively, the shapes of the group bars may be changed such that the user can easily distinguish them.

Each of the group display switch buttons 909 is a button for switching between displaying and hiding the files of the individual form images in the corresponding group. In a case where the group display switch button 909 is pressed to set the hiding mode, the rows indicating the files of the corresponding individual form images are not displayed, as illustrated by "Unlearned03" in the scanned form list 901 in FIG. 9. This enables only the group bar 908 to be displayed, as illustrated by "Unlearned03" in the scanned form list 901 in FIG. 9.

The list display order key selection list 910 is a pull-down for selecting an item based on which to change the display order of the files of the form images displayed in the scanned form list 901. Examples of the items included in the list display order key selection list 910 include "Form name", "Form name (descending order)", "From unlearned", and "From unlearned (descending order)".

In a case where "Form name" is selected, the files are sorted such that the files of the learned form images are firstly displayed in ascending order of their file names and then the files of the unlearned form images are displayed in ascending order of their file names. In a case where "Form name (descending order)" is selected, the files are sorted such that the files of the learned form images are firstly displayed in descending order of their file names and then the files of the unlearned form images are displayed in descending order of their file names. In a case where "From unlearned" is selected, the files are sorted such that the files of the unlearned form images are firstly listed in ascending order of their file names and then the files of the learned form images are listed in ascending order of their file names. In a case where "From unlearned (descending order)" is selected, the files of the form images are sorted such that the files of the unlearned form images are firstly listed in descending order of their file names and then the files of the learned form images are listed in descending order of their file names.

Ascending order is, for example, an order of arrangement such as a numerical order from "1" to "9" and an alphabetical order from "A" to "Z". Likewise, in the following, ascending order or descending order means sorting based on the file names.

The list display filter list 911 is a pull-down for selecting an item based on which to display only the files of particular form images in the scanned form list 901. Examples of the item include "All", "Learned", "Unlearned", and "File name yet to be entered".

"All" is an item for displaying the files of all displayable form images. "Learned" is an item for displaying the files of only the learned form images among the displayable form images. "Unlearned" is an item for displaying the files of only the unlearned form images. "File name yet to be entered" is an item for displaying the files of only the form images whose file names are default values.

For example, in FIG. 9, "All" is selected in the list display filter list 911, so that the files of all form images are displayed. By selecting, for example, "Learned" in the list display filter list 911, the files in the groups "Unlearned01", "Unlearned02", and "Unlearned03" can be hidden.

[Setting File Name]

The user can set the file name of a form image to be saved to the storage server 130 with the file name setting screen 1000 illustrated in FIGS. 10A and 10B. The file name setting screen 1000 in FIG. 10A is a diagram illustrating an example of the screen with no text block selected. A file name entry field 1001 is a region for displaying a file name set by the user. Also, touching the blank portion in the file name entry field 1001 displays a software keyboard, with which the user can enter any characters. In a state where a character string to be the file name is entered and displayed, touching this character string displays a software keyboard for correcting the character string in the touched portion, with which the entered and displayed characters can be corrected. A preview region 1002 is a region for displaying a preview of the form image.

Further, by touching a text block in the displayed preview image, the user can add the character string in the text block at the touched position into the file name entry field 1001 as a character string that forms the file name. The text block selected with a touch or the like may be highlighted by adding a line, a frame, a color, or the like to the text block or the like so that the user can notice that it has been selected. Also, in a case where the user selects a plurality of text blocks, the colors of the text blocks may be set to different colors. Also, the display position and magnification of the preview may be changed such that the selected text block appears at the center. Also, in a case where there are a plurality of text blocks, the display position of the preview may be calculated such that a preset number of text blocks will be displayed. For example, the preview may be displayed with its display position and magnification changed such that the center between the uppermost region and the lowermost region among regions used for the file name appears at the vertical center of the preview region. Touching a once selected text block again unselects the text block, deletes the corresponding character string, and brings the text block back to the state where the line, color, or the like added to it is not displayed.

In the file name setting screen 1000 in FIG. 10A, no text block is displayed in the preview image. However, text blocks may be displayed in a visually recognizable manner by using a color or frames in order to indicate the selectable portions to the user. Meanwhile, a button or the like may be used to switch between enabling and disabling the visually recognizable display of the text blocks. Performing a swipe operation on the preview image can move the position of the preview image displayed in the preview region 1002.

A deletion button 1003 is a button for deleting the characters corresponding to the trailing text block among the characters displayed in the file name entry field 1001. An enlargement button 1004 is a button for increasing the display magnification of the preview image displayed in the preview region 1002. A reduction button 1005 is a button for reducing the display magnification of the preview image displayed in the preview region 1002. At the time of enlargement and reduction, the display position is adjusted such that the coordinates of the center of the preview region 1002 remains the same as before the enlargement and reduction. An initial display button 1006 is a button for setting the display magnification and the display position of the preview image back to their initial states in a case where the display position has been changed by a swipe operation and/or the display magnification has been changed with the enlargement button 1004 or the reduction button 1005. An OK button 1007 is a button for bringing the UI screen back to the above-described storage save screen 900 illustrated in FIG. 9 at the point when the file name is set, in order to transmit the form image data to the MFP cooperative server 120 along with the set file name.

FIG. 10B is a diagram illustrating the file name setting screen 1000 in a case where a text block detected as "Quotation" by character recognition is firstly selected and a text block detected as "ShimomarukoCorporation" by character recognition is subsequently selected. In the file name entry field 1001, two character strings corresponding to the text blocks have been entered in the order in which they were touched, and an underscore has been entered as a separator between the two character strings. Note that the underscore may be entered manually by the user and entered automatically.

[Details of Scanned Image Analysis Process]

Figure 11:
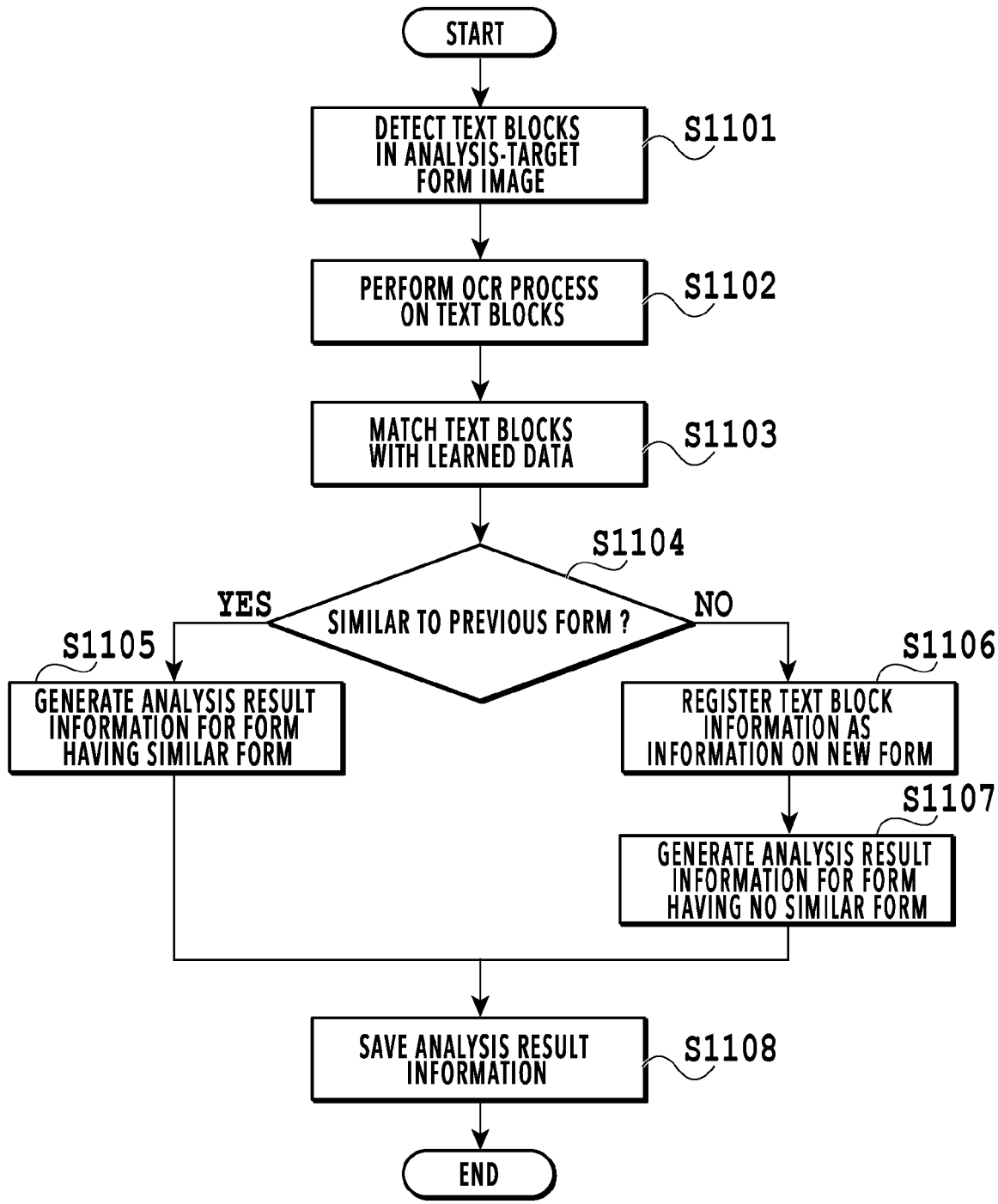
FIG. 11 is a flowchart illustrating details of an image analysis process.

Next, details of the analysis process (S508) performed by the MFP cooperative server 120 in the present embodiment will be specifically described along a flowchart in FIG. 11. Specifically, the CPU of the MFP cooperative server 120 executes the series of processes illustrated in the flowchart in FIG. 11 by loading program code stored in the ROM into the RAM and executing it. Also, the functions of some or all of the steps in FIG. 11 may be implemented with hardware such as an ASIC or an electronic circuit. Meanwhile, the symbol "S" in the description of each process means a step in the flowchart. From among the form images obtained by the scans performed this time, one analysis-target form image is selected, and the processes in the flowchart in FIG. 11 are performed on the analysis-target form image.

In S1101, the image processing unit 432 obtains the analysis-target form image associated with the analysis request. The image processing unit 432 then detects the text blocks present in the analysis-target form image. As a result, the arrangement and sizes of the text blocks contained in the analysis-target form image are identified on a per character string basis.

In S1102, the image processing unit 432 performs a character recognition process on all text blocks detected by analyzing the form image in S1101.

In S1103, the image processing unit 432 executes the form determination process described earlier on the analysis-target form image. In S1104, whether a similar form having a document format matching the document format of the analysis-target form image is found from the learned data is determined based on the result of the process in S1103. If a similar form is found (YES in S1104), then in S1105, the image processing unit 432 generates analysis result information indicating the result of the analysis.

FIGS. 12A and 12B are diagrams illustrating examples of the data structure of the analysis result information on the form image generated in S1105 or S1107 to be described later. FIG. 12A illustrates an example of the data structure of the analysis result information in a case where a form in the learned data determined as being similar to the analysis-target form image is a learned form for which setting-time input information has been saved.

If the analysis-target form image is of a learned form, the image processing unit 432 obtains the text blocks among all text blocks detected from the analysis-target form image which correspond to the text blocks registered as the setting-time input information in the similar form. In the present embodiment, the text blocks registered as the setting-time input information are text blocks containing the character strings used in the file name of the similar form. The image processing unit 432 then generates analysis result information based on the text blocks in the analysis-target form image corresponding to the registered text blocks in the similar form.

In the analysis result information in FIG. 12A generated in this step, "matched" stores a value based on the result of the form determination process, indicating whether a similar form similar to the analysis-target form image has been found from the learned data. "matched" holds "true" if a similar form is present, and holds "false" if no similar form is present.

"formId" is an item holding a value serving as an identifier uniquely indicating the type of the form. If a similar form is present, "formId" holds the same value as the value given to this similar form.

"matchingScore" stores a value indicating the degree of similarity between the analysis-target form image and the similar form. The value held in "matchingScore" is a real number value from 0 to 1 representing the degree of match between the arrangement information on the text blocks in the similar form and the arrangement information on the text blocks in the analysis-target form image. Here, a larger value indicates that the analysis-target form image is an image of a form more similar to the similar form.

"rectInfoArray" holds information indicating the text blocks in the analysis-target form image corresponding to the text blocks in the similar form containing the character strings designated by the user to set the file name of the similar form. "rectInfoArray" contains one or more sets of pieces of information "key", "region", "rect", and "text".

"key" holds a unique value identifying a text block to be used for the file name. "region" holds information on the text block identified by the corresponding "key". Further, in "region", there are "rect" as an item holding coordinate information on the text block and "text" as an item holding the character string recognized from the text block. In "rect", "x" represents the X coordinate of the upper left corner of the text block, "y" represents the Y coordinate of the upper left corner, "width" represents the number of pixels in the X direction, and "height" represents the number of pixels in the Y direction. "text" is an item holding the character string obtained by performing an OCR process on the text block indicated by "rect".

"metadataArray" is an item holding information indicating the order of the text blocks to be used for the file name and a delimiter therebetween for automatic entry of the file name. "metadataArray" contains pieces of information "key", "keyType", and "value".

"key" stores a value uniquely indicating a setting item to be set for the form image. "keyType" stores a value indicating the type of the setting value in "key". "key" holds "filename" and "keyType" holds "filename" in a case of using the information held in "rectInfoArray" for the file name.

"value" holds information on the order of the character strings to be used and a character that separates the character strings for generation of a setting value based on the value of "key". The example of FIG. 12A indicates generation of the setting value (file name) by using the region with "key" holding "fileRegion0" in "rectInfoArray", a delimiter, and the region with "key" holding "fileRegion1" in "rectInfoArray" in this order. More specifically, the example of FIG. 12A indicates generation of a file name "Quotation ShimomarukoCorporation".

Also, in a case where other properties than the file name such as metadata are set, necessary information is added to "rectInfoArray" and "metadataArray".

If, on the other hand, no similar form is present (NO in S1104), then in S1106, the image processing unit 432 instructs the data management unit 434 to register information on the arrangement of the text blocks in the analysis-target form image and the like in the learned data as the document format of a new form.

Specifically, at the point of this step, setting-time input information on the new form such as its file name has not been set by the user, but at least the arrangement information on the text blocks in the analysis-target form image is registered in the learned data as information on the new form. In other words, the arrangement information on the text blocks in an unlearned form is registered in the learned data.

Among the plurality of scanned images obtained by the scans performed this time, the next analysis-target scanned image will be matched with the learned forms registered in the learned data before the execution of its scan and also will be matched with the new form registered in S1106 to determine whether the next analysis-target scanned image is similar to any one of them.

In a case where a property such as the file name is set by the user after the end of this flowchart, the information on the text blocks registered in S1106 is registered in the learned data as a learned form along with this setting-time input information.

In S1107, the image processing unit 432 generates analysis result information on the analysis-target form image. FIG. 12B is a diagram illustrating the analysis result information in the case where the analysis-target form image is an unlearned form. As illustrated in FIG. 12B, if no similar form is present, the analysis result information includes only the items "matched" and "formId". Note that as for the value of "formId", a new value is given as a new form, and "formId" holds that value.

In S1108, the image processing unit 432 stores the analysis result information generated in S1105 or S1107 in the HDD of the MFP cooperative server 120, and ends the processing in this flowchart. After the end of the processing in the flowchart in FIG. 11, the processing is controlled such that an unanalyzed form image is selected as the analysis-target form image from among the form images obtained by the scans performed this time and this flowchart is repeated until there is no unanalyzed form image.

In a case where the next analysis-target form image is similar to the new form registered in the process in S1106, the image processing unit 432 determines in S1104 that a similar form is present (YES in S1104), and proceeds to S1105. In this case, since the new form is an "unlearned form" for which no setting-time input information has been saved, the analysis-target form image is an "unlearned form image" even if the result of the determination in S1104 is YES. Thus, in the process in S1105 in the case where the analysis-target form image is determined as being similar to the new form, the analysis result information is generated with no information stored in or after "rectInfoArray" in the analysis result information in FIG. 12A. Note that as for the value to be held in "formId", the same value of "formId" as that given to the similar form image is given.

The pieces of analysis result information thus generated will be used to create the storage save screen 900 in S513. With these pieces of analysis result information, the files of form images having the same value of "formId" are grouped and displayed together. In particular, in the present embodiment, in a case where an unlearned form image for which no setting-time input information has been saved is similar to another unlearned form image, "formId" in its analysis result information holds the same value as that of the similar unlearned form image.

For example, for the form images with the file names "201911201100(1)" and "201911201100(3)" in the scanned form list 901 in FIG. 9, the same value of "formId" is given in the respective pieces of analysis result information as a result of the flowchart in FIG. 11. Thus, images of the same document format can be displayed together in the scanned form list 901 even if they are of unlearned forms. Hence, even in a case where a plurality of new forms are scanned, the user can check the files of their form images by type.

A group name corresponding to the value held in "formId" is stored, for example, in the HDD of the MFP cooperative server 120. This group name associated with the value held in "formId" is obtained and displayed as the group name in the corresponding group bar 908 in the storage save screen 900.

Each group name may be generated based on, for example, the file names of the corresponding form images generated by combining the character strings in text blocks in them. Each group name may also be editable by the user.

For example, as for the group name of a form registered as a new form in S1106, a group name formed of a character string indicating that the form is an unlearned form and a serial number is generated and stored in the HDD of the MFP cooperative server 120 in association with the value of "formId".

In the case where a group name is generated or edited, the group name associated with the value of "formId" is also updated. For example, in S514, the one or more character strings forming the group name and the position information on the corresponding text blocks are also sent to the MFP cooperative server 120 and, in S516, the group name is updated and saved. Note that the analysis result information may be provided with a region to hold a group name and a group name may be held in the analysis result information. Here, methods of determining and updating a group name will be described in detail in later-described Embodiments 2 and 3.

As described above, according to the present embodiment, the files of form images obtained by scanning unlearned new forms for which no setting-time input information has been saved can also be displayed such that similar forms are grouped together. In this way, even in the case where a plurality of new forms are scanned, the user can easily find the file of a desired new form image. Thus, the burden on the user can be eased.

Note that while the storage save screen 900 and the file name setting screen 1000 have been described as screens to be displayed on the touchscreen of the MFP 110, they may be displayed on a display unit of another information processing apparatus in the image processing system 100 such as the client PC. In this case, the client PC issues a request to the MFP cooperative server 120 for screen information for displaying the storage save screen 900 and the file name setting screen 1000. By using the pieces of analysis result information, the MFP cooperative server 120 returns the client PC screen information on the storage save screen 900 for displaying the respective form images such that those with the same value of "formId" are displayed together. In this case too, the user can check the files of the form images by form type on the web browser of the client PC.

Embodiment 2

In Embodiment 2, a description will be given of a method in which an analysis-target form image and a learned form determined as being similar to the analysis-target form image are compared with each other to update the group name registered in association with the value of their "formId" to a more appropriate name. In the present embodiment, its difference from Embodiment 1 will be mainly described. Features that are not particularly specified are the same components and processes as those in Embodiment 1.

FIGS. 13A and 13B are diagrams illustrating an example of a "group name list" in a table form, the "group name list" holding group names associated with values of "formId". The "group name list" is stored in the HDD of the MFP cooperative server 120.

FIG. 13A illustrates an example of the group name list stored before scans are executed this time. The group name list will be described with reference to FIG. 13A. The group name list holds information on group names associated with respective rows (records), i.e., respective values of "formId". The group names held by form type in the group name list have been registered based on the analysis results or learning results obtained when previous forms were scanned. The registration of a new form in the group name list will be described in Embodiment 3.

Next, the items in the group name list (the columns in the table) will be described. "groupNo" holds serial numbers in a database. "formId" holds values uniquely indicating form types, as explained in FIGS. 12A and 12B.

"formName" holds group names associated with the respective form types, i.e., the respective values of "formId". "fileRegion0" to "fileRegionN" each hold part of the character strings used in the group names. Each group name has been generated using part of the file name of a form image. "fileRegion0" to "fileRegionN" in the group name list hold the character strings in "text" of "fileRegion0" to "fileRegionN" contained in the analysis result information explained in FIGS. 12A and 12B, which indicate the character strings in the text blocks to be used to generate a file name. Note that, of "fileRegion0" to "fileRegionN" in the analysis result information, only the information in one or more "fileRegion"s with the character strings used in the group name is transferred to the corresponding one or ones of "fileRegion0" to "fileRegionN" in the group name list. That is, not all character strings forming the file name are necessarily used in the group name. Thus, of the character strings in "fileRegion0" to "fileRegionN" in the analysis result information, only the one or more character strings used in the group name are held. Note that the information on the positions of the text blocks from which the character strings held in "fileRegion0" to "fileRegionN" are recognized is also held but is omitted.

The user can modify each group name, and "userText" holds any character string designated by the user and accepted by the MFP cooperative server 120. In a case where duplicate group names are generated, "duplicateNum" holds serial numbers to be added to these group names so that the group names can be distinguished from each other.

Each group name held in "formName" is formed of the character strings held in "fileRegion0" to "fileRegionN", "userText", and "duplicateNum" and a separator(s). As the separator, the same character as the delimiter used in file names may be used, or a different character may be set. The present embodiment will be described on the assumption that the separator is _ (underscore). "formNameArray" holds the order of arrangement of the character strings in each group name, which is formed of the character strings in "fileRegion0" to "fileRegionN", "userText", and "duplicateNum" and the separator(s).

In a case where the analysis-target form image in the flowchart in FIG. 11 is of a learned form, the group name associated with its value of "formId" is obtained from the group name list. In the present embodiment, however, the currently stored group name is not used as is. In the present embodiment, the information of the group name list and the character strings in the analysis-target form image are compared with each other, and the group name currently held in the group name list is updated to an appropriate name.

Figure 14:
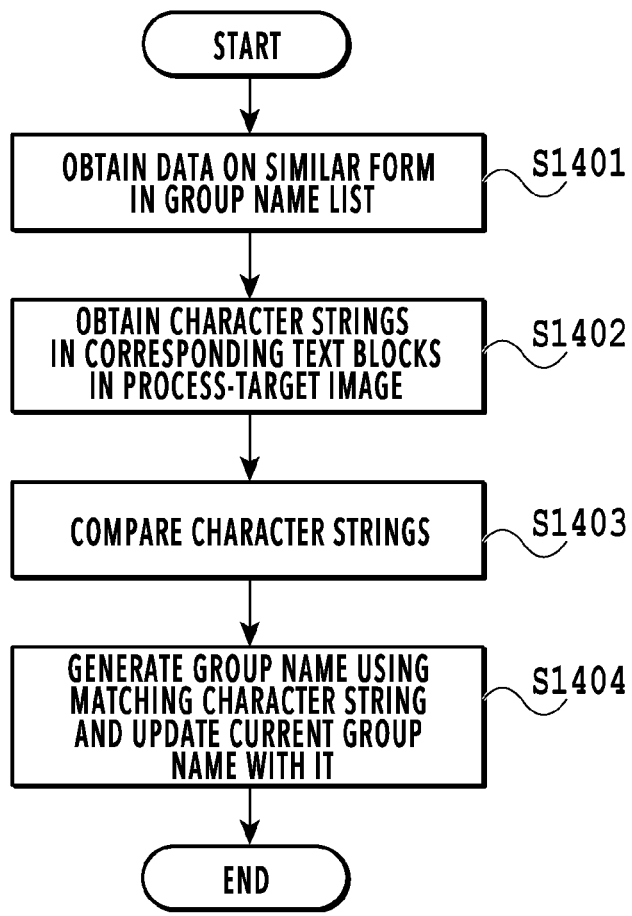
FIG. 14 is a flowchart illustrating details of a group name update process.

FIG. 14 is a flowchart for explaining a process which, in a case where the form images obtained by the scans performed this time include a learned form image, updates a group name with this learned form image as the process target. This flowchart is executed after the analysis process illustrated in FIG. 11 is performed on all form images obtained by the scans performed this time.

In S1401, from the group name list saved in the HDD of the MFP cooperative server 120, the image processing unit 432 obtains the information on the group name associated with the value of "formId" in the analysis result information on the process-target form image.

Assume, for example, that the value of "formId" of a similar form has been obtained in S1105, and "aaaaaaaa-ffff-49ab-acf8-55558888eeee" has been held as the value of "formId" in the analysis result information of the process-target form image. In this case, in the current group name list in FIG. 13A, the information of the record with "groupNo" of 1, in which "formId" is "aaaaaaaa-ffff-49ab-acf8-55558888eeee", is obtained as the information on the group name. Note that, in FIG. 13A, "Invoice_ShimomarukoCorporation" is held as the group name associated with "formId" of "aaaaaaaa-ffff-49ab-acf8-55558888eeee". In the following, this flowchart will be described on the assumption that the information on the group name of the similar form similar to the process-target form image is the information of the record with "groupNo" of 1.

In S1402, in a case where character strings in the similar form are used in the group name obtained in S1401, the image processing unit 432 obtains the position information on the text blocks of these character strings. The image processing unit 432 then identifies the text blocks present at the same positions as the obtained text block positions among the text blocks in the process-target form image, and obtains the character strings contained in these text blocks. Here, being the same is not limited to being exactly the same. Corresponding text blocks present at nearby positions may be included as the text blocks at the same positions.

For example, in the group name list in FIG. 13A at the start of the scans, the record with "groupNo" of 1 holds character strings in "fileRegion0" and "fileRegion1". The group name is therefore formed using the character strings held in the text blocks indicated by "fileRegion0" and "fileRegion1". Thus, the position information on the text blocks at "fileRegion0" and "fileRegion1" in the record with "groupNo" of 1 is obtained, and the character strings in the text blocks in the process-target form image at the same positions as these text blocks are obtained.

Note that in a case where the form images obtained by the scans performed this time include a plurality of form images determined as being similar to the same form in the learned data, the character strings are similarly obtained from the other form image(s) as well.

In S1403, the image processing unit 432 compares the character strings used in the group name in the group name list and the character strings obtained in S1402 with each other.

FIG. 15 is a diagram in which the character strings forming the group name held in the current group name list and the character strings obtained in S1402 are organized in a table form for the purpose of comparison. The record with "No" of 1 in the table in FIG. 15 indicates the character strings used in the group name in the record with "groupNo" of 1 in the group name list. In the record with "groupNo" of 1, the character string in "fileRegion0" is "Invoice" and the character string in "fileRegion1" is "ShimomarukoCorporation". The record with "No" of 2 in the table in FIG. 15 indicates the character strings in the text blocks which correspond to "fileRegion0" and "fileRegion1" and obtained from the process-target form image. In the process-target form image, the character string in "fileRegion0" is "Quotation", and the character string in "fileRegion1" is "ShimomarukoCorporation".

As illustrated in FIG. 15, the character strings in "fileRegion1" are the same whereas the character strings in "fileRegion0" are "Invoice" in the registered group name and "Quotation" in the process-target form image. As described above, comparing the character strings in the process-target form image and those in the currently registered group name with each other may indicate that text blocks at the same position contain different character strings. Then, if the registered group name is used as is as the group name of the process-target form image and the group name is displayed with "Invoice" included therein, a group name with a character string not contained in the form image is displayed. For the user, this is not preferable for finding the file of the form image. Hence, in the present embodiment, the previously generated group name is not used as is but the group name is updated.

In S1404, the image processing unit 432 generates a group name representing the type of the process-target form image by using a matching character string among the character strings forming the current group name and the character strings obtained in S1402 based on the result of the comparison in S1403. The non-matching character strings are not used in the group name. In the example of FIG. 15, the image processing unit 432 generates the group name by using the character strings in "fileRegion1", which match each other between both forms. For example, the image processing unit 432 sets the character string "ShimomarukoCorporation" in "fileRegion1" as the group name. The image processing unit 432 then updates the group name held in "formName" in the record with "groupNo" of 1 in the group name list to "ShimomarukoCorporation". As a result, the group name list is now in a state where the updated group name "ShimomarukoCorporation" is held in "formName" in the record with "groupNo" of 1, as illustrated in FIG. 13B.

The group name updated in S1404 will be used to create the screen information of the scanned form list 901 in S512. Specifically, the group names registered in the updated group name list will be displayed in the group bars 908 in the scanned form list 901.

As described above, according to the present embodiment, a character string common to similar forms is used as their group name among the characteristic character strings used in their file names or the like. This enables generation of a characteristic group name common to all similar forms. Thus, even in a case where the number of forms similar to forms in the learned data increases, it is possible to reduce the burden of an operation in which the user him- or herself performs maintenance on characteristic group names so as to make the groups distinguishable. It is therefore possible to save the user's effort and time for finding a desired form even in a case where a plurality of form image groups are present in a mixed manner in a list.

Embodiment 3

Embodiment 1 has been described such that the group name of the files of unlearned form images is generated using a character string indicating that the forms are unlearned and a serial number, like "Unlearned01". However, in a case where the form images obtained by the scans performed this time include many unlearned form images, it will be difficult for the user to find the file of a form image. In view of this, in Embodiment 3, a description will be given of a method of determining an appropriate group name for the files of unlearned form images and displaying the files under the group name. In the present embodiment, its difference from Embodiment 2 will be mainly described. Features that are not particularly specified are the same components and processes as those in Embodiment 2.

[Process of Generating Group Name of Unlearned Form]

Figure 16:
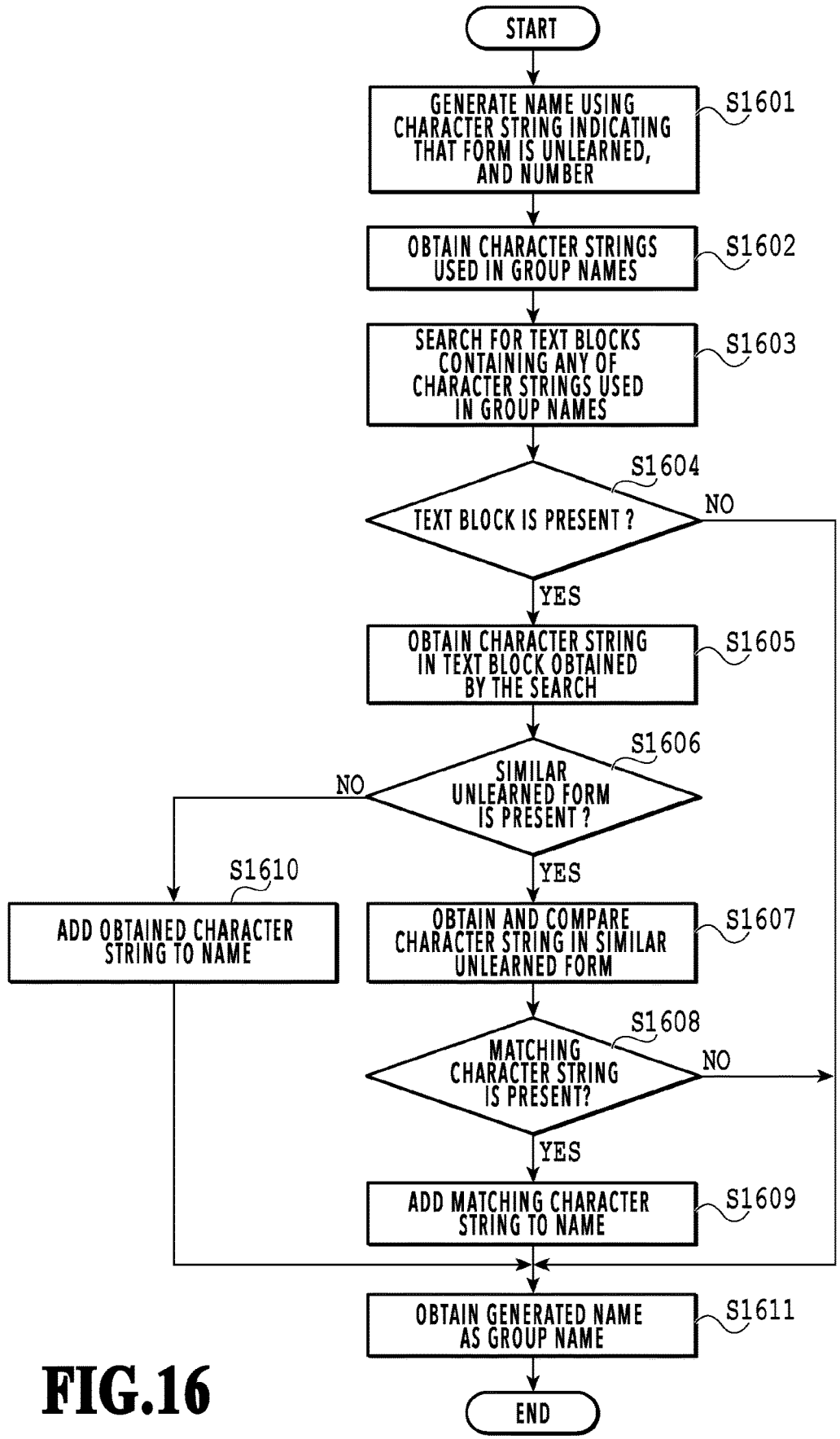
FIG. 16 is a flowchart illustrating details of a group name generation process.

FIG. 16 is a flowchart for determining the group name of an unlearned form among the form images obtained by the scans performed this time. This flowchart is executed after the analysis process illustrated in FIG. 11 is performed on all forms scanned this time. Also, this flowchart will be described on the assumption that one of any form image for which it has been determined that no similar form is present in S1104 in FIG. 11 is the process target. In a case where there are a plurality of form images for which it has been determined that no similar form is present, the processing in this flowchart is performed on each of them as the process targets.

In S1601, the image processing unit 432 generates a name combining a character string indicating that the form is an unlearned form, and a numeric character. The numeric character is a serial number that is incremented each time a group name is generated for an unlearned file. For example, for the first form image to be processed in this flowchart, a name "Unlearned01" is generated.

Note that the name to be generated is not limited to a name such as "Unlearned01". Instead of the character string "Unlearned", another character string indicating that information for setting a property has not been saved (such as "New") may be used. Also, instead of the numeric character representing a serial number, a character for distinguishing the group name from others (such as an alphabetic character) may be used. This flowchart will be described on the assumption that "Unlearned01" is generated in S1601.

In S1602, the image processing unit 432 obtains the character strings used in the group names registered in the group name list stored in the HDD of the MFP cooperative server 120.

Assume that FIG. 13B is the group name list stored at the start of this flowchart. In this case, the character strings held in "fileRegion0" to "fileRegionN" in the group name list in FIG. 13B are obtained in this step. The character strings used in the group names before the start of this flowchart are "Quotation", "ShimomarukoCorporation", "KawasakiCorporation", "ShinagawaCorporation", "TokyoCorporation", and "Invoice", excluding the duplicate character strings. Thus, these character strings are obtained in this step. That is, the character strings in the group names of the registered learned forms are obtained.

In S1603, the image processing unit 432 searches the process-target form image for text blocks containing any of the character strings obtained in S1602. The result of an OCR process on each form image has been stored as "character recognition result". Thus, the image processing unit 432 searches the character recognition result of the process-target form image for the target character strings to search for text blocks with any of them.

FIGS. 18A and 18B are diagrams illustrating form images scanned this time. FIG. 18A illustrates the process target unlearned form image in this flowchart. FIG. 18B is a diagram illustrating another form image similar to the form image in FIG. 18A, which will be described later.

FIGS. 19A and 19B are diagrams illustrating, in a table form, the character recognition results obtained by performing an OCR process on the form images. The character recognition result in FIG. 19A is an example of the character recognition result obtained by performing an OCR process on the form image in FIG. 18A. The character recognition result in FIG. 19B is an example of the character recognition result obtained by performing an OCR process on the form image in FIG. 18B. The character recognition results have been saved in, for example, the HDD of the MFP cooperative server 120.

The character recognition results in FIGS. 19A and 19B will now be described. The records in the character recognition results (the rows in the tables) hold a value or text data of each of items "rectNo", "x", "y", "width", "height", and "text", and a record is generated for each text block. "rectNo" is a column holding serial numbers of the text blocks.

"x" is a column holding the x coordinates of the upper left corners of the text blocks, "y" is a column holding the y coordinates of the upper left corners of the text blocks, "width" is a column holding the numbers of pixels in the text blocks in the X direction, and "height" is a column holding the numbers of pixels in the text blocks in the Y direction. "text" is a column holding the character strings contained in these text blocks. In the present embodiment, for the coordinates in each image, a coordinate system is used in which the origin is the upper left corner and the vertical direction and the horizontal direction extend in the Y direction and the X direction respectively, for example.

Assume that the character strings obtained in S1602, which are used in the previous group names, are "Quotation", "ShimomarukoCorporation", "KawasakiCorporation", "ShinagawaCorporation", "TokyoCorporation", and "Invoice". Assume also that the character recognition result of the process-target form image is FIG. 19A. In this case, in S1603, the image processing unit 432 sets the character strings in the column "text" in FIG. 19A as the search range. Then, the image processing unit 432 searches the search range for any of the character strings "Quotation", "ShimomarukoCorporation", "KawasakiCorporation", "ShinagawaCorporation", "TokyoCorporation", and "Invoice" to search for text blocks with any of them. By the process in this step, the text block with "rectNo" of 1, which contains "Quotation", is obtained from the character recognition result in FIG. 19A as the search result. Similarly, the text block with "rectNo" of 4, which contains "QuotationNo:", and the text block with "rectNo" of 11, which contains "KawasakiCorporation", are obtained as the search result.

In a case where the same character string is present in a plurality of text blocks, the text block with the higher or highest degree of match with the search value is kept as the search result. For example, "Quotation" in "rectNo" of 1 and "QuotationNo:" in "rectNo" of 4 are character strings both containing "Quotation", but the character string in the text block with "rectNo" of 1 has a higher degree of match with "Quotation". For this reason, the text block with "rectNo" of 4 is excluded from the search result.

In S1604, the image processing unit 432 determines whether one or more text blocks containing any of the character strings used in the group names are present in the character recognition result of the process-target form image, based on the result of the search in S1603. If one or more text blocks are present (YES in S1604), the image processing unit 432 proceeds to S1605.

In S1605, the image processing unit 432 obtains the character strings contained in the text blocks obtained by the search in S1603. Specifically, of the character strings used in the other group names, the character strings also contained in the process-target unlearned form image are obtained by this step. For example, in the case of the character recognition result in FIG. 19A, the character strings "Quotation" and "KawasakiCorporation" are obtained from the text blocks with "rectNo" of 1 and 11, respectively.

In S1606, the image processing unit 432 determines whether an unlearned form image similar to the process-target form image in this flowchart is present among the form images obtained by the scans performed this time. Specifically, the process-target form image in this flowchart is a form image for which it has been determined that a form similar to it is not present in the learned data, but has been registered in the learned data as a new form in S1106. For this reason, in a case where a form image being an unlearned form image obtained by a scan performed this time is similar to the process-target form image in this flowchart, "formId" in its analysis result information has been given the same value as the value of "formId" of the process-target form image. Thus, it is determined that an unlearned form image similar to the process-target form image in this flowchart is present if there is a form image holding the same value of "formId", for example.

FIG. 18B illustrates an example of a form image among the form images of a plurality of unlearned forms obtained by scans performed this time which has been determined as being similar to the form image in FIG. 18A, which is the process target in this flowchart.

If a similar unlearned form is present (YES in S1606), then in S1607, the image processing unit 432 obtains the character strings in the text blocks in the character recognition result of the similar unlearned form image that are present at the same positions as the text blocks obtained by the search in S1603. Here, being the same is not limited to being exactly the same. Corresponding text blocks such as ones present at nearby positions may be included as the text blocks at the same positions.

FIG. 19B illustrates a character recognition result obtained by performing an OCR process on the unlearned form image in FIG. 18B similar to the process-target form image. In S1607, from FIG. 19B, the text block with "rectNo" of 1 in FIG. 19B is identified, which is present at a position corresponding to, that is, at the same position as or a position near, the text block with "rectNo" of 1 in FIG. 19A obtained by S1603. Moreover, the text block with "rectNo" of 11 in FIG. 19B is identified, which is present at a position corresponding to the text block with "rectNo" of 11 in FIG. 19A. Then, from the character recognition result in FIG. 19B, the character strings "Quotation" and "KawasakiCorporation" are obtained from the text blocks with "rectNo" of 1 and 11, respectively.

Note that in a case where there are a plurality of similar unlearned form images, character strings are obtained from these form images in a similar manner. Then, the image processing unit 432 compares the character strings obtained in S1607 and the character strings obtained in S1605 with each other.

In S1608, the image processing unit 432 determines whether one or more matching character strings are present based on the result of the comparison in S1607 between the character strings obtained from the process-target form image and the character strings obtained from the form image similar to the process-target form image. If one or more matching character strings are present (YES in S1608), the image processing unit 432 proceeds to S1609. For example, the character strings in "rectNo" of 1 and 11 in FIG. 19B are "Quotation" and "KawasakiCorporation", respectively. In the example of FIGS. 19A and 19B, both "Quotation" and "KawasakiCorporation" are the same character strings as the character strings obtained from the process-target form image. Thus, the image processing unit 432 determines that matching character strings are present.

In S1609, the image processing unit 432 adds the character strings determined as matching character strings by the comparison in S1607 to the name generated in S1601 to thereby generate a group name. Note that the non-matching character strings are not used in the group name. In the case of adding a new character string to a name, providing a delimiter makes the boundary between the elements noticeable. Thus, for example, the character strings may be added with _ (underscore) inserted between the character strings.

For example, if the result of the comparison in S1607 indicates that the character strings common to the plurality of forms are "Quotation" and "KawasakiCorporation", then, the group name generated in S1609 is "Unlearned01_Quotation_KawasakiCorporation".

On the other hand, if another unlearned form image similar to the process-target form image is not present (NO in S1606), then in S1610, the image processing unit 432 adds the character strings obtained in S1605 to the name generated in S1601 to thereby generate a name.

In S1611, the image processing unit 432 stores the generated group name of the new form in the group name list saved in the HDD of the MFP cooperative server 120. Specifically, the generated group name is stored in the group name list in association with the value of "formId" of the process-target form image.

FIGS. 17A and 17B are diagrams illustrating the group name list in the form of a table. FIG. 17A illustrates the group name list after the group name of the unlearned form image is stored. Assume that the value of "formId" of the process-target form image in this flowchart is "ffffffff-kkkk-81ab-acf9-77772222jjjj". Assume also that the group name generated by the processing in this flowchart is "Unlearned01_Quotation_KawasakiCorporation". In this case, the generated group name is stored in association with the value of "formId", as indicated by the record with "groupNo" of 6 in FIG. 17A.

Meanwhile, there is a case where it is determined in S1604 that the character recognition result of the process-target form image includes none of the text blocks containing in the character strings used in the group names (NO in S1604). In this case, the name generated in S1601 is stored as the group name in association with the value of "formId" of the process-target form image. Specifically, "Unlearned01" generated in S1601 is stored in the group name list in association with the value of "formId" of the process-target form image.

Likewise, in a case where no matching character string is present (NO in S1608), the name generated in S1601 is also stored as the group name in association with the value of "formId" of the process-target form image.

[Process of Updating Group Name of Unlearned Form]

In a case where the user enters a file name for the unlearned form image after the end of the flowchart in FIG. 16, the group name generated in the flowchart in FIG. 16 is updated according to this entered file name.

Figure 20:
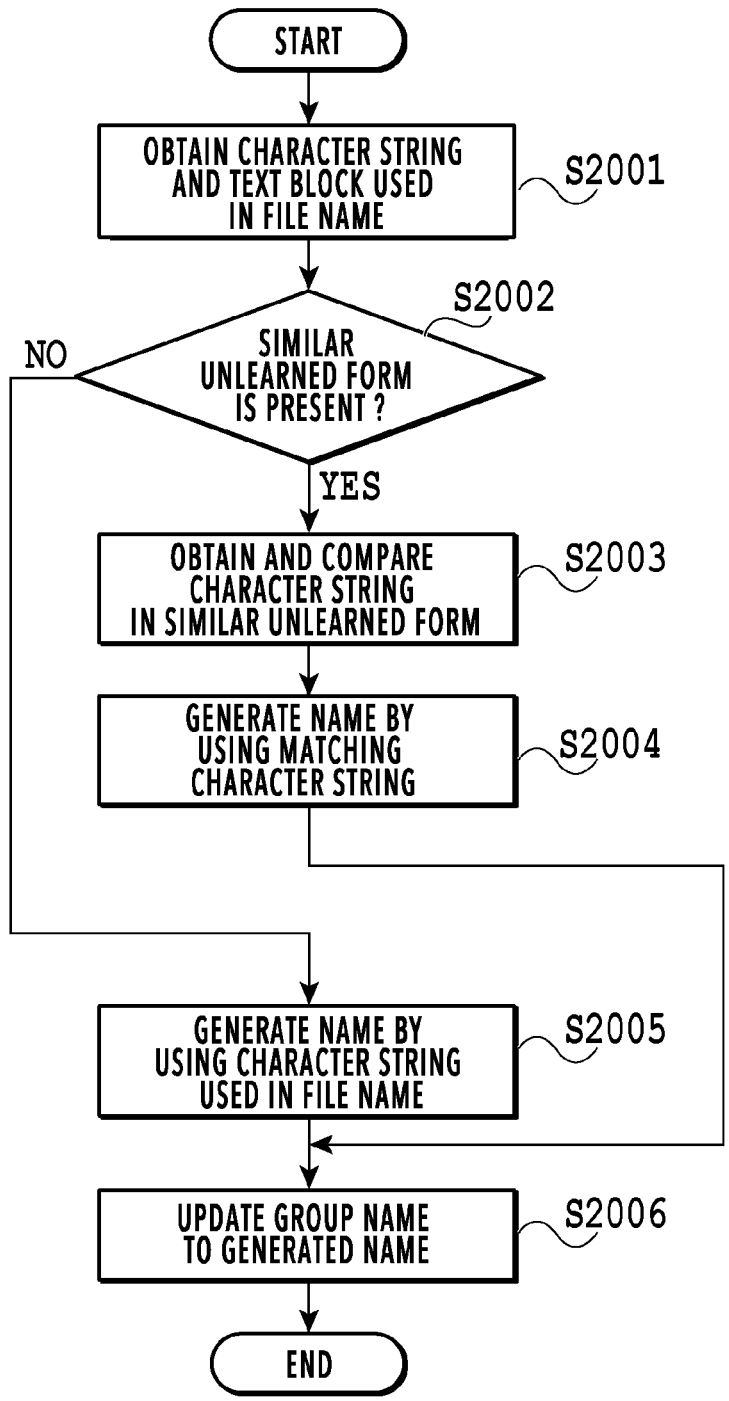
FIG. 20 is a flowchart illustrating details of a group name generation process.

FIG. 20 is a flowchart of a process of updating a group name after file information is entered. The processing in this flowchart is executed on a form image, as the process target, whose file name is entered by the user.

In S2001, the image processing unit 432 obtains the character strings used in the file name of the process-target form image and, if these character strings are character strings selected from among the character strings in the process-target form image, obtains the position information on the text blocks containing these character strings.

FIG. 21 illustrates the analysis result information on the unlearned form image updated after the user has entered information for generating its file name (file information). In FIG. 21, the region at and below "rectInfoArray" holds data in the same structure as that in the analysis result information in FIG. 12A. The example of FIG. 21 indicates that the user has generated a file name using the character string in "fileRegion0", a delimiter, the character string in "fileRegion1", a delimiter, and the character string in "fileRegion2"

in this order. Thus, from the updated analysis result information, the character strings in the file name entered by the user and their text blocks are obtained.

Specifically, in the case of FIG. 21, the position information on the text block "fileRegion0" and the character string "Quotation" contained in this text block are obtained by S2001. Similarly, the position information on the text block "fileRegion1" and the character string "KawasakiCorporation" therein, and the position information on the text block "fileRegion2" and the character string "M5432" therein are obtained.

Note that in the case where file information is entered, the entered file information may be stored as data separate from the analysis result information.

In S2002, the image processing unit 432 determines whether an unlearned form image similar to the process-target form image in this flowchart is present among the form images obtained by the scans performed this time.

The method of making the determination is similar to that in S1606, in which, for example, it is determined that an unlearned form image similar to the process-target form image in this flowchart is present if there is a form image holding the same value of "formId" as the value of "formId" of the process-target form image.

If a similar unlearned form is present (YES in S2002), then in S2003, the image processing unit 432 obtains the character strings contained in the text blocks in the other form image similar to the process-target form image that are present at the same positions as the text blocks obtained in S2001. Since the character recognition results obtained by performing an OCR process on the form images have been stored, the image processing unit 432 searches the character recognition results for the text blocks and obtains the character strings therein. Here, being the same is not limited to being exactly the same. Corresponding text blocks present at nearby positions may be included as the text blocks at the same positions. Note that in a case where there are a plurality of similar unlearned forms, character strings are obtained from these unlearned forms in a similar manner.

Then, among the character strings obtained in S2003 and the character strings obtained in S2001, the image processing unit 432 compares the character strings in the corresponding text blocks present at the same or nearby positions with each other.

FIG. 22 is a diagram in which the character strings in each form are organized in a table form for the purpose of comparison between the character strings obtained in S2001 and the character strings obtained in S2003. The record with "No" of 1 in the table in FIG. 22 indicates the character strings obtained in S2001. The record with "No" of 2 in the table indicates the character strings obtained in S2003. As illustrated in FIG. 22, the character strings in "fileRegion0" and "fileRegion1" in the two forms match each other whereas the character strings in "fileRegion2" in the two forms differ from each other.

In S2004, the image processing unit 432 generates a group name representing the type of the process-target form image by using the matching character strings among the character strings in the process-target form image and the character strings in the form image similar to the process-target form image based on the result of the comparison in S2003. In the example of FIG. 22, the image processing unit 432 generates the group name by using the character string "Quotation" in "fileRegion0" and the character string "KawasakiCorporation" in "fileRegion1", which match each other between both forms. The character strings may be added with _ (underscore) inserted between the character strings. For example, a group name such as "Quotation_KawasakiCorporation" is generated.

If no similar unlearned form is present (NO in S2002), then in S2005, the image processing unit 432 generates the group name by using the character strings used in the file name.

In S2006, the image processing unit 432 updates the group name list stored in the HDD of the MFP cooperative server 120 based on the generated group name. FIG. 17B illustrates an example of the group name list updated by the processing in this flowchart. Assume that the value of "formId" of the process-target form image in this flowchart is "ffffff-kkkk-81ab-acf9-77772222jjjj", and the group name generated by the processing in this flowchart is "Quotation_Kawasaki-Corporation". In this case, the group name list is updated such that the generated group name is held in "formName", as indicated by the record with "groupNo" of 6 in FIG. 17B.

The group name list updated by the processing in the flowcharts in FIGS. 16 and 20 will be used to create the screen information of the storage save screen 900. Thus, the group names registered in the updated group name list can be displayed in the group bars 908 in the scanned form list 901.

As described above, according to the present embodiment, the files of form images obtained by scanning unlearned new forms for which no setting-time input information has been saved can also be displayed such that the form images are grouped together with a group name indicating their features displayed. In this way, it is possible to ease the burden on the user for entering a group name and performing other similar operations. Also, even in a case where a plurality of new forms are scanned, the user can easily find the file of a desired new form image. Thus, the burden on the user can be eased.

OTHER EMBODIMENTS

In the above embodiments, the analysis process in FIG. 11 and the group name generation or update processes in FIGS. 14, 16, and 20 have been described as processes performed by the image processing unit 432 of the MFP cooperative server 120. However, they may be performed by the image processing unit 424 of the MFP 110.

In the case where the image processing unit 432 generates a group name, the image processing unit 432 may perform a process of excluding a character string such as one indicating a date and a form-specific unique character string such as "M5432" from the group name to be generated. For example, in the case of a form in Japanese, the image processing unit 432 may perform a process by which a character string formed solely of at least one of a numeric value, alphabetic characters, or symbols or a character string combining a date and a numeric value is not used in the group name.

Also, in Embodiments 2 and 3, configurations in which the MFP cooperative server 120 generates a group name have been described. Additionally, the group names in the storage save screen 900 may be editable by the user after the storage save screen 900 is displayed. For example, a user instruction to add any character string to a group name, a user instruction to add the character string in any text block to a group name, or the like may be accepted.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-089594 filed May 22, 2020, which is hereby incorporated by reference wherein in its entirety.

What is claimed is:

1. An image processing apparatus comprising:
at least one memory that stores a program; and
at least one processor that executes the program to perform:
determining whether similar forms similar to a plurality of scanned images are present;
giving, in a case where it is determined that a similar form similar to a target scanned image is present, the target scanned image the same identifier as an identifier given to the similar form; and
controlling a display to display a list of the plurality of scanned images,
wherein scanned images given the same identifier are displayed together as one group in the list.

2. The image processing apparatus according to claim 1, wherein
the at least one processor executes the program to further perform detecting text blocks in each of the plurality of scanned images,
wherein it is determined, based on arrangement of the detected text blocks, whether the similar forms similar to the plurality of scanned images are present.

3. The image processing apparatus according to claim 2, wherein the at least one processor executes the program to further perform registering, as a new form, information on the arrangement of the text blocks in a scanned image determined that no similar form is present.

4. The image processing apparatus according to claim 3, wherein, in a case where a target scanned image is registered as the new form, the at least one processor executes the program to further perform determining whether a similar form similar to a scanned image to be targeted immediately after the target scanned image is present among a form registered in advance and the registered new form.

5. The image processing apparatus according to claim 1, further comprising a character recognition unit configured to recognize character strings contained in text blocks detected from the scanned images.

6. The image processing apparatus according to claim 5, wherein the at least one processor executes the program to further perform:
obtaining, in a case where the plurality of scanned images include a first scanned image similar to a first similar form for which information for setting a property has been saved, a first character string forming a group name for the first similar form;
obtaining, in a case where a character string contained in a text block in the first similar form is used in at least part of the group name for the first similar form, a second character string in the first scanned image that is present in a region corresponding to the text block in the first similar form; and
updating the group name for the first similar form such that the group name is a group name generated to include a character string in matching portions of the obtained first character string and the obtained second character string and not to include character strings in non-matching portions of the obtained first character string and the obtained second character string.

7. The image processing apparatus according to claim 6, wherein the at least one processor executes the program to further perform controlling the display to display the updated group name as a group name under which to display together scanned images similar to the first similar form.

8. The image processing apparatus according to claim 5, wherein the at least one processor executes the program to further perform:
obtaining, in a case where the plurality of scanned images include an unlearned scanned image for which information for setting a property has not been saved, a third character string forming a group name under which to display together learned scanned images for which information for setting a property has been saved;
obtaining, from a second scanned image among the plurality of scanned images for which it is determined that the similar form is not present, information on a fourth text block containing the obtained third character string and a fourth character string contained in the text block;
obtaining a fifth character string which is present in another unlearned scanned image similar to the second scanned image and is contained in a text block at a region corresponding to the obtained fourth text block; and
generating a first group name including a character string in matching portions of the obtained fourth character string and the obtained fifth character string and not including character strings in non-matching portions of the obtained fourth character string and the obtained fifth character string,
wherein the generated first group name is used as a group name under which to display together the second scanned image and the other unlearned scanned image similar to the second scanned image.

9. The image processing apparatus according to claim 8, wherein the first group name is generated such that the first group name includes a character string indicating that information for setting a property has not been saved.

10. The image processing apparatus according to claim 9, wherein in a case where the second scanned image does not include the obtained third character string or the character string in the matching portions is not present, the first group name is generated with the character string indicating that information for setting a property has not been saved and a character string for distinguishing the first group name from another group name.

11. The image processing apparatus according to claim 8, wherein the at least one processor executes the program to further perform:
   obtaining, in a case where a file name is set for the second scanned image and a character string contained in a text block in the second scanned image is used in at least part of the set file name of the second scanned image, information on a sixth text block and a sixth character string contained in the sixth text block used to set the file name;
   obtaining a seventh character string which is present in another unlearned scanned image similar to the second scanned image among the plurality of scanned images and is contained in a text block at a region corresponding to the sixth text block; and
   generating a second group name and updating the first group name to the second group name, the second group name including a character string in matching portions of the obtained sixth character string and the obtained seventh character string and not including character strings in non-matching portions of the obtained sixth character string and the obtained seventh character string.

12. The image processing apparatus according to claim 6, wherein the group name is generated such that the character string forming the group name does not include a character string representing a date or a character string formed solely of at least one of a numeric value, alphabetic characters, or symbols.

13. The image processing apparatus according to claim 6, further comprising an acceptance unit configured to accept a user instruction to edit a generated group name.

14. The image processing apparatus according to claim 1, wherein the list is displayed in a state that a file of a scanned image for which information for setting a property has been saved and a file of a scanned image for which information for setting a property has not been saved are displayed to be separate from each other.

15. The image processing apparatus according to claim 1, wherein the list is displayed in a state that files of scanned images of which the similar forms are same are displayed together by using a group bar displaying a group name.

16. The image processing apparatus according to claim 15, wherein the list is displayed in a state that a group bar indicating a group of scanned images for which information for setting a property has been saved and a group bar indicating a group of scanned images for which information for setting a property has not been saved differ from each other in background color.

17. The image processing apparatus according to claim 6, wherein the property includes at least a file name.

18. An image processing method comprising:
   determining whether similar forms similar to a plurality of scanned images are present;
   giving, in a case where it is determined that a similar form similar to a target scanned image is present, the target scanned image the same identifier as an identifier given to the similar form; and
   controlling a display to display a list of the plurality of scanned images,
   wherein scanned images given the same identifier are displayed together as one group in the list.

19. A non-transitory computer-readable storage medium storing a program which causes a computer to perform:
   determining whether similar forms similar to a plurality of scanned images are present;
   giving, in a case where it is determined that a similar form similar to a target scanned image is present, the target scanned image the same identifier as an identifier given to the similar form; and
   controlling a display to display a list of the plurality of scanned images,
   wherein scanned images given the same identifier are displayed together as one group in the list.

* * * * *